(12) United States Patent
Wakashiro et al.

(10) Patent No.: US 7,103,468 B2
(45) Date of Patent: Sep. 5, 2006

(54) TROUBLE DETECTOR OF VEHICLE HAVING DECELERATION IDLING-CYLINDER ENGINE

(75) Inventors: Teruo Wakashiro, Shioya-gun (JP); Atsushi Matsubara, Utsunomiya (JP); Shinichi Kitajima, Utsunomiya (JP); Kan Nakaune, Nasu-gun (JP); Yasuo Nakamoto, Utsunomiya (JP); Toshinari Shinohara, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 256 days.

(21) Appl. No.: 10/488,255

(22) PCT Filed: Sep. 13, 2002

(86) PCT No.: PCT/JP02/09430

§ 371 (c)(1),
(2), (4) Date: Oct. 1, 2004

(87) PCT Pub. No.: WO03/025375

PCT Pub. Date: Mar. 27, 2003

(65) Prior Publication Data

US 2005/0055152 A1 Mar. 10, 2005

(30) Foreign Application Priority Data

Sep. 14, 2001 (JP) .................................. 2001-280587

(51) Int. Cl.
*F02D 45/00* (2006.01)
*F02D 41/22* (2006.01)
*F01L 13/00* (2006.01)

(52) U.S. Cl. .................. 701/110; 123/198 F; 73/116

(58) Field of Classification Search .............. 701/110, 701/114, 112, 99; 123/198 F, 198 DB; 73/116
See application file for complete search history.

(56) References Cited

U.S. PATENT DOCUMENTS

| 6,047,674 | A   |   | 4/2000  | Kadowaki et al. |          |
|-----------|-----|---|---------|-----------------|----------|
| 6,085,706 | A   |   | 7/2000  | Kadowaki et al. |          |
| 6,213,069 | B1  |   | 4/2001  | Wada et al.     |          |
| 6,857,491 | B1  | * | 2/2005  | Wakashiro et al.| 180/65.2 |

FOREIGN PATENT DOCUMENTS

| DE | 198 41 734 A1 |   | 9/1998  |
|----|---------------|---|---------|
| DE | 100 16 589 A1 |   | 4/2000  |
| EP | 1 365 115 A2  | * | 11/2003 |
| EP | 1 426 599 A1  | * | 6/2004  |
| JP | 57-131840     |   | 8/1982  |
| JP | 5-180019      |   | 7/1993  |

(Continued)

*Primary Examiner*—Hieu T. Vo
(74) *Attorney, Agent, or Firm*—Arent Fox PLLC

(57) ABSTRACT

A failure detection device for a vehicle having a deceleration deactivatable engine, by which failure detection, performed primarily by monitoring the oil pressure of operation oil, is ensured. The failure detection device is provided for a vehicle having a deceleration deactivatable engine in which it is possible to deactivate at least one cylinder by closing both of intake and exhaust valves thereof by applying the oil pressure of operation oil to a passage for deactivation execution via an actuator, and also it is possible to cancel the closed state of both of the intake and exhaust valves by applying the oil pressure of the operation oil to a passage for deactivation cancellation. The failure detection device includes an oil pressure condition judgement section (steps S204 and S212) which determines whether the oil pressure of the operation oil measured by a POIL sensor satisfies threshold conditions, and an abnormality judgement section (steps S207 and S215) which determines that abnormality exists when it is determined, by the oil pressure condition judgement section, that the oil pressure of the operation oil does not satisfy the threshold conditions.

8 Claims, 14 Drawing Sheets

FOREIGN PATENT DOCUMENTS

| | | |
|---|---|---|
| JP | 8-21295 | 1/1996 |
| JP | 8-177436 | 7/1996 |
| JP | 8-312316 | 11/1996 |
| JP | 11-82080 | 3/1999 |
| JP | 11-141359 | 5/1999 |
| JP | 11-190234 | 7/1999 |
| JP | 11-247673 | 9/1999 |
| JP | 11-350995 | 12/1999 |
| JP | 3059170 | 4/2000 |
| JP | 2000-97068 | 4/2000 |
| JP | 2000-125405 | 4/2000 |
| JP | 2001-82188 | 3/2001 |
| JP | 2002-201972 | 7/2002 |
| JP | 2002-221055 | 8/2002 |

* cited by examiner

TROUBLE DETECTOR OF VEHICLE HAVING DECELERATION IDLING-CYLINDER ENGINE

FIELD OF THE INVENTION

The present invention relates to a failure detection device for a vehicle having an engine with deactivatable cylinders.

DESCRIPTION OF RELATED ART

A hybrid vehicle having not only an engine but also an electric motor as the drive source is known in the art. As a type of hybrid vehicle, a parallel hybrid vehicle is known that uses an electric motor as an auxiliary drive source for assisting the engine output.

In the parallel hybrid vehicle, the power of the engine is assisted by the electric motor during acceleration traveling. On the other hand, during deceleration traveling, the battery and the like are charged via a deceleration regenerating operation. According to various control operations including the above, the remaining battery charge (remaining electric energy) of the battery is maintained while also satisfying the driver's demands. Because the drive train of the parallel hybrid vehicle comprises the engine and the motor coupled to the engine in series, the whole system is simple in structure, light in weight, and has great flexibility for installation in a vehicle.

As variations of the parallel hybrid vehicle, two types of hybrid vehicles are known; one is disclosed in, for example, Japanese Unexamined Patent Application, First Publication No. 2000-97068, in which a clutch is disposed between the engine and the motor in order to eliminate the effect of engine friction (i.e., engine brake) during the deceleration regenerating operation; the other is disclosed in, for example, Japanese Unexamined Patent Application, First Publication No. 2000-125405, in which the engine, the motor, and a transmission are directly connected in series in order to ultimately simplify the structure.

The hybrid vehicle of the former type exhibits disadvantages in that the installability of the power train is degraded due to the complexity in the constitution of the clutch, and the transmission efficiency of the power train may be reduced during normal traveling as well due to the use of the clutch. On the other hand, the hybrid vehicle of the latter type exhibits a disadvantage in that the driving power assisted by the electric motor (assisted power) is restricted because regenerated electric energy is reduced due to the aforementioned engine friction.

A cylinder deactivation technique has been proposed to solve the above problem; however, it is difficult to detect failures if a conventional hydraulic mechanism is employed as the cylinder deactivation technique.

SUMMARY OF THE INVENTION

In order to solve the above problems, the present invention provides a failure detection device for a vehicle having a deceleration deactivatable engine. In a deceleration deactivatable engine, it is possible to deactivate at least one cylinder by closing both the intake and the exhaust valves thereof by applying the oil pressure of operation oil to a passage for deactivation execution via an actuator, and also it is possible to cancel the closed state of both of the intake and exhaust valves by applying the oil pressure of the operation oil to a passage for deactivation cancellation. The failure detection device of the present invention comprises: a driving state distinguishing section for distinguishing the current driving state of the vehicle from several driving states; an oil pressure measuring section provided in the passage for deactivation cancellation for measuring the oil pressure of the operation oil; an oil pressure condition judgement section for determining whether or not the oil pressure of the operation oil measured by the oil pressure measuring section satisfies threshold conditions for the oil pressure of the operation oil in each of the driving states; and an abnormality judgement section for making judgement that an abnormality exists when it is determined, by the oil pressure condition judgement section, that the oil pressure of the operation oil does not satisfy the threshold conditions.

Accordingly, when the oil pressure of the operation oil measured by the oil pressure measuring section in each of the driving states does not satisfy the conditions defined by the thresholds for each of the operation states, it is deemed to be abnormal by the abnormality judgement section; thus, it is possible to determine that the oil pressure is not properly measured, or oil pressure is not properly applied to the passage for deactivation execution or the passage for deactivation cancellation.

In the failure detection device of the present invention, the driving states may preferable include a engine stopped state before engine starting, a normal driving operation including idling operation, a deceleration cylinder deactivation operation, an idling stop mode in which the engine is stopped under predetermined conditions and the engine is started when the predetermined conditions are not satisfied.

Accordingly, the above failures can be detected regardless of the driving states.

In the failure detection device of the present invention, the threshold conditions for the oil pressure of the operation oil for the normal driving operation may preferably set depending on the revolution rate of the engine.

Accordingly, oil pressure varies depending on engine revolution rate can be taken into consideration.

In the failure detection device of the present invention, the threshold conditions for the oil pressure of the operation oil set depending on the revolution rate of the engine may be preferably set taking into consideration the temperature of the operation oil.

Accordingly, the threshold can be set taking into consideration not only the pressure of the operation oil varying depending on engine revolution rate, but also the temperature of the operation oil.

The failure detection device of the present invention may further comprise: an intake passage negative pressure measuring section for measuring the negative pressure in an intake passage; an intake passage negative pressure condition judgement section for determining whether or not the negative pressure in the intake passage measured by the intake passage negative pressure measuring section satisfies negative pressure threshold conditions for the deceleration cylinder deactivation operation; and an abnormality during cylinder deactivation judgement section for making judgement that abnormality exists even when it is determined that abnormality does not exist by the abnormality judgement section, and when it is determined, by the intake passage negative pressure condition judgement section, that the negative pressure in the intake passage does not satisfy the negative pressure threshold conditions.

Accordingly, during the deceleration cylinder deactivation operation, even when no abnormality is detected by the abnormality judgement section, and when it is determined by the intake negative pressure measuring section that the intake passage negative pressure does not satisfy the conditions of the threshold value for the deceleration cylinder deactivation operation, it is deemed to be abnormal by the abnormality during cylinder deactivation judgement section, and it is possible to detect that oil pressure is not applied to the cylinder deactivation mechanism through the passage for deactivation, or through the passage for canceling deactivation.

In the failure detection device of the present invention, the negative pressure threshold conditions may be preferably set depending on the revolution rate of the engine and are corrected depending on atmospheric pressure.

Accordingly, the intake passage negative pressure varying depending on engine revolution rate can be corrected in accordance with atmospheric pressure.

In the failure detection device of the present invention, the vehicle may be a hybrid vehicle which has not only the engine but also an electric motor as the drive source, and in which regenerative braking is performed by the motor, when the vehicle is decelerated, depending on the deceleration state of the vehicle.

Accordingly, failure detection in a hybrid vehicle is ensured.

In the failure detection device of the present invention, a cylinder deactivation mechanism of the engine may be a mechanism in which a cylinder deactivation state and a cylinder deactivation cancellation state are altered by a slide element operated by the pressure of the operation oil.

BRIEF DESCRIPTION OF THE DRAWINGS

FIG. 3A shows a cross-section of the main part of the variable valve timing mechanism in a cylinder activation state, and FIG. 3B shows a cross-section of the main part of the variable valve timing mechanism in a cylinder deactivation state.

DESCRIPTION OF THE PREFERRED EMBODIMENTS

The preferred embodiments of the present invention will be explained below with reference to the appended drawings.

Figure 1:
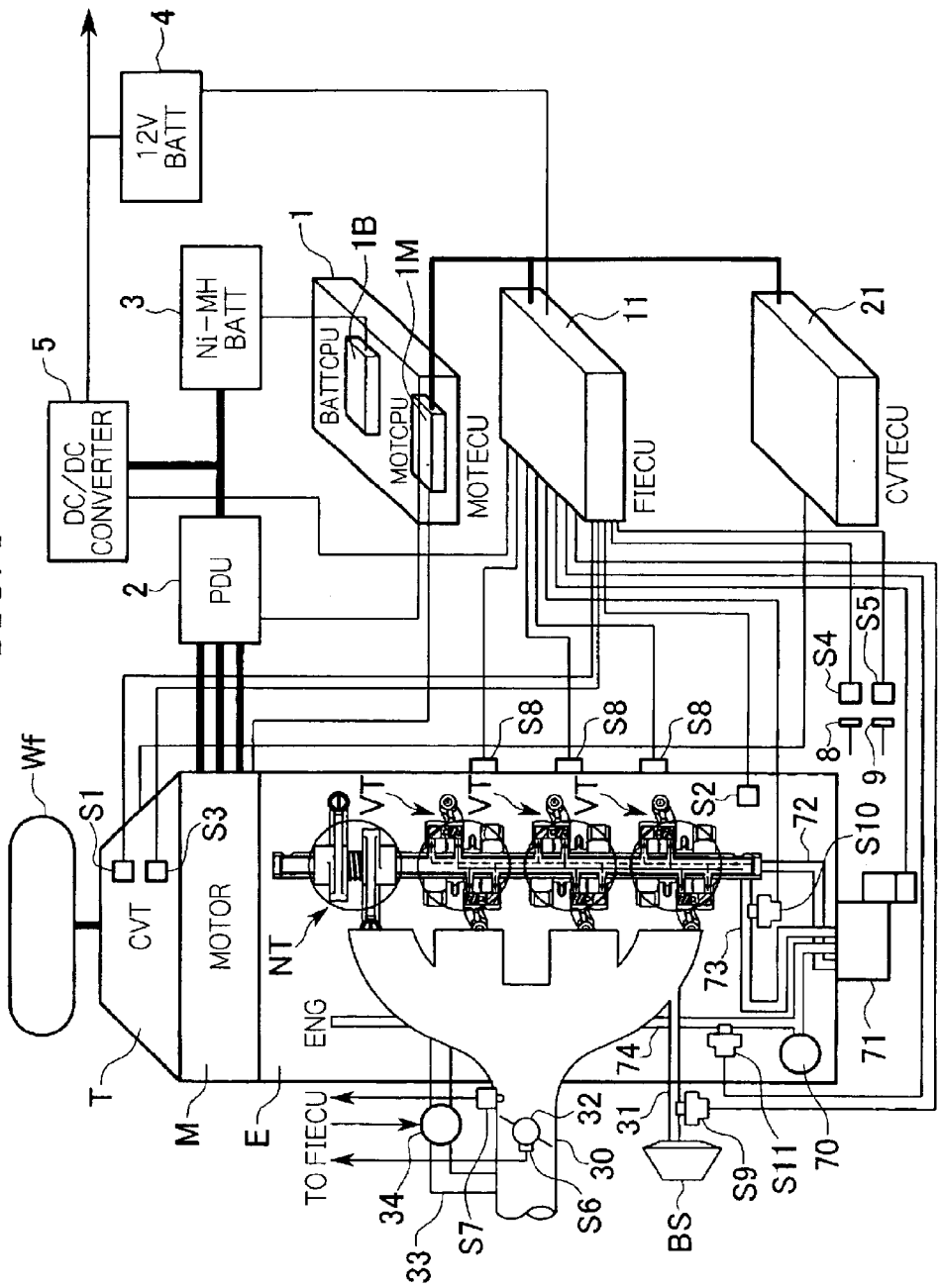
FIG. 1 is a block diagram showing the general structure of a hybrid vehicle in an embodiment according to the present invention.

FIG. 1 is a block diagram schematically illustrating a parallel hybrid vehicle in a first embodiment of the present invention, in which an engine E, an electric motor M, and a transmission T are directly coupled to each other in series. The driving force generated by both the engine E and the electric motor M is transmitted via, for example, a CVT (continuously variable transmission) as the transmission T (the transmission T may be a manual transmission) to front wheels Wf as driving wheels. When the driving force is transmitted from the driving wheels Wf to the electric motor M during deceleration of the hybrid vehicle, the electric motor M functions as a generator for applying a so-called regenerative braking force to the vehicle, i.e., the kinetic energy of the vehicle is recovered and stored as electric energy. Note that elements related to both a vehicle having a manual transmission and a vehicle having a CVT are shown in FIG. 1 for convenience in explanation.

The driving of the motor M and the regenerating operation of the motor M are controlled by a power drive unit (PDU) 2 according to control commands from a motor CPU 1M of a motor ECU 1. A high-voltage nickel metal hydride battery 3 for sending and receiving electric energy to and from the motor M is connected to the power drive unit 2. The battery 3 includes a plurality of modules connected in series, and in each module, a plurality of cell units are connected in series. The hybrid vehicle includes a 12-volt auxiliary battery 4 for energizing various accessories. The auxiliary battery 4 is connected to the battery 3 via a downverter 5 or a DC—DC converter. The downverter 5, controlled by an FIECU 11, makes the voltage from the battery 3 step-down and charges the auxiliary battery 4. Note that the motor ECU 1 comprises a battery CPU 1B for protecting the battery 3 and calculating the remaining battery charge thereof. In addition, a CVTECU 21 is connected to the transmission T, which is a CVT, for controlling the same.

The FIECU 11 controls, in addition to the motor ECU 1 and the downverter 5, a fuel injection valve (not shown) for controlling the amount of fuel supplied to the engine E, a starter motor, ignition timing, etc. To this end, the FIECU 11 receives various signals such as a signal from a speed sensor S1 for sensing vehicle speed VP, a signal from an engine revolution rate speed sensor S2 for sensing engine revolution rate speed NE, a signal from a shift position sensor S3 for sensing the shift position of the transmission T, a signal from a brake switch S4 for detecting the operation of a brake pedal 8, a signal from a clutch switch S5 for detecting the operation of a clutch pedal 9, a signal from a throttle opening-degree sensor S6 for sensing the degree of throttle opening TH of a throttle valve 32, a signal from an intake negative pressure sensor (intake negative pressure measuring section) S7 for sensing negative pressure in the air-intake passage, a signal from a knocking sensor S8, and the like.

Reference symbol BS indicates a booster associated with the brake pedal, in which a master vac negative pressure sensor S9 is provided for sensing negative pressure in the brake master vac (hereinafter referred to as master vac negative pressure), and the master vac negative pressure sensor S9 is connected to the FIECU 11.

Note that the intake negative pressure sensor S7 and the throttle opening-degree sensor S6 are provided in an air-intake passage 30, and the master vac negative pressure sensor S9 is provided in a communication passage 31 connected to the air-intake passage 30.

The air-intake passage 30 is provided with a secondary air passage 33 for air communication between the upstream portion with respect to the throttle valve 32 and the downstream portion, and the secondary air passage 33 is provided with a control valve 34. The purpose of providing the secondary air passage 33 is to supply a small amount of air into the cylinders even when the air-intake passage 30 is completely closed by the throttle valve 32. The control valve 34 is controlled by means of the signal from the FIECU 11 in accordance with the intake negative pressure measured by the intake negative pressure sensor S7. A POIL (oil pressure measuring section) sensor S10, a solenoid of a spool valve (actuator) 71, and a TOIL (oil temperature) sensor S11, all of which will be explained below, are also connected to the FIECU 11.

The engine E includes three cylinders associated with the variable valve timing mechanism (i.e., a cylinder deactivation mechanism) VT on both an intake side and an exhaust side, and a cylinder associated with a conventional valve mechanism NT which has no relationship to the cylinder deactivation operation.

In other words, the engine E is a deactivatable engine in which the operation state may be alternated between normal operation in which all four cylinders including three deactivatable cylinders are active and a cylinder deactivation operation in which three deactivatable cylinders are inactive. In the engine E, the operation of the intake valves IV and exhaust valves EV associated with the deactivatable cylinders can be temporarily stopped by means of the variable valve timing mechanism VT.

Next, the variable valve timing mechanism VT will be explained in detail with reference to FIGS. 2 to 4.

Figure 2:
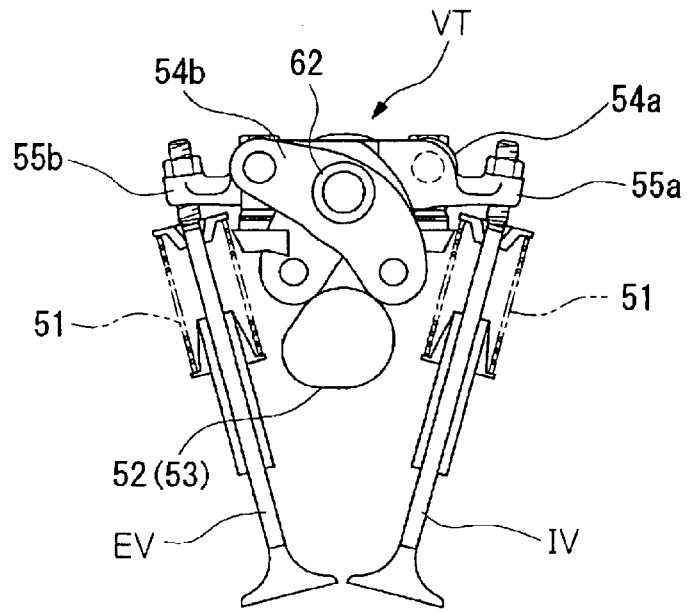
FIG. 2 is a front view showing a variable valve timing mechanism used in the embodiment of the present invention.

FIG. 2 shows an example of an SOHC engine provided with the variable valve timing mechanism VT which is adapted for a cylinder deactivation operation. The cylinder (not shown) is provided with the intake valve IV and the exhaust valve EV which are biased by valve springs 51 and 51 in a direction which closes the intake port (not shown) and exhaust port (not shown), respectively. Reference symbol 52 indicates a lift cam provided on a camshaft 53. The lift cam 52 is engaged with an intake cam lifting rocker arm 54a for lifting the intake valve and an exhaust cam lifting rocker arm 54b for lifting the exhaust valve, both of which are rockably supported by a rocker arm shaft 62.

Figure 3A:
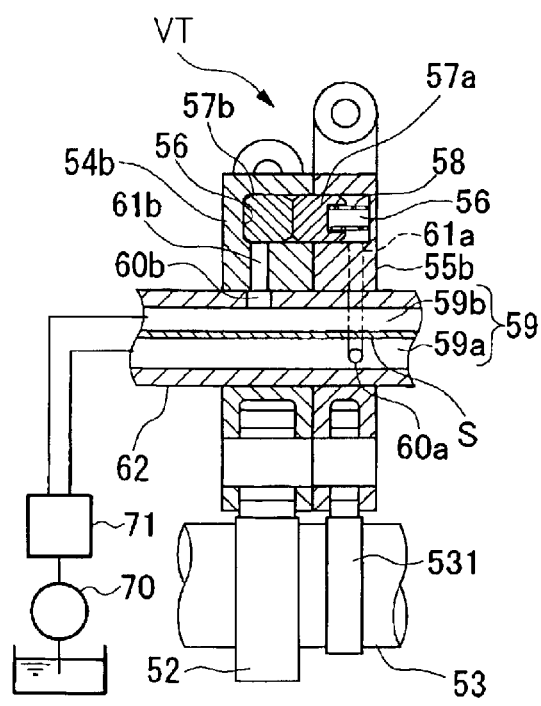
FIGS. 3A and 3B show the variable valve timing mechanism used in the embodiment of the present invention; in particular.
Figure 3B:
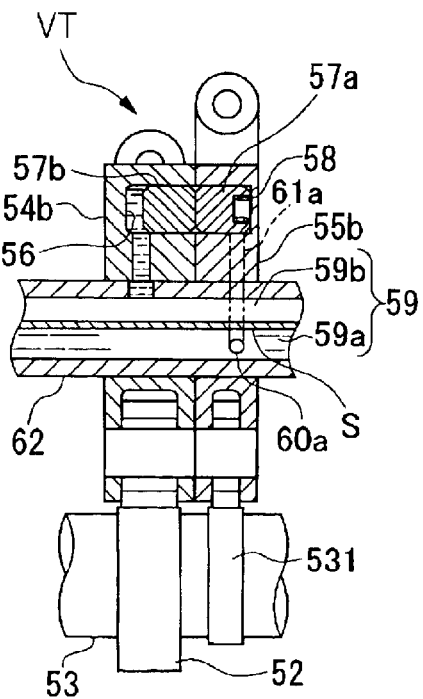

The rocker arm shaft 62 also supports valve operating rocker arms 55a and 55b in a rockable manner, which are located adjacent to the cam lifting rocker arms 54a and 54b, and whose rocking ends press the top ends of the intake valve IV and the exhaust valve EV, respectively, so that the intake valve IV and the exhaust valve EV open their respective ports. As shown in FIGS. 3A and 3B, the proximal ends (opposite the ends contacting the valves) of the valve operating rocker arms 55a and 55b are adapted so as to be able to engage a circular cam 531 provided on the camshaft 53.

FIGS. 3A and 3B show, as an example, the cam lifting rocker arm 54b and the valve operating rocker arm 55b provided in the exhaust valve side.

As shown in FIGS. 3A and 3B, a hydraulic chamber 56 is formed in the cam lifting rocker arm 54b and the valve operating rocker arm 55b in a continuous manner, which is located on the opposite side of the rocker arm shaft 62 with respect to the lift cam 52. The hydraulic chamber 56 is provided with a pin (slide element) 57a and a disengaging pin (slide element) 57b both of which are slidable and biased toward the cam lifting rocker arm 54b by means of a pin spring 58.

The rocker arm shaft 62 is provided with, in its inside, a hydraulic passage 59 which is divided into hydraulic passages 59a and 59b by a partition S. The hydraulic passage (passage for deactivation execution) 59b is connected to the hydraulic chamber 56 at the position where the disengaging pin 57b is located via an opening 60 of the hydraulic passage 59b and a communication port (passage for deactivation execution) 61b in the cam lifting rocker arm 54b. The hydraulic passage (passage for deactivation cancellation) 59a is connected to the hydraulic chamber 56 at the position where the pin 57a is located via an opening 60 of the hydraulic passage 59a and a communication port (passage for deactivation cancellation) 61a in the valve operating rocker arm 55b, and is adapted to be further connectable to a drain passage (not shown).

As shown in FIG. 3A, the pin 57a is positioned by the pin spring 58 so as to bridge the cam lifting rocker arm 54b and the valve operating rocker arm 55b when hydraulic pressure is not applied via the hydraulic passage 59b. On the other hand, when hydraulic pressure is applied via the hydraulic passage 59b in accordance with a cylinder deactivation signal, both of the pin 57a and the disengaging pin 57b slide toward the valve operating rocker arm 55b against the biasing force of the pin spring 58, and the interface between the pin 57a and the disengaging pin 57b corresponds to the interface between the cam lifting rocker arm 54b and the valve operating rocker arm 55b to disconnect these rocker arms 54b and 55b, as shown in FIG. 3B. The intake valve side is also constructed in a similar manner. The hydraulic passages 59a and 59b are connected to an oil pump 70 via the spool valve 71 which is provided for ensuring hydraulic pressure of the variable valve timing mechanism VT.

Figure 4:
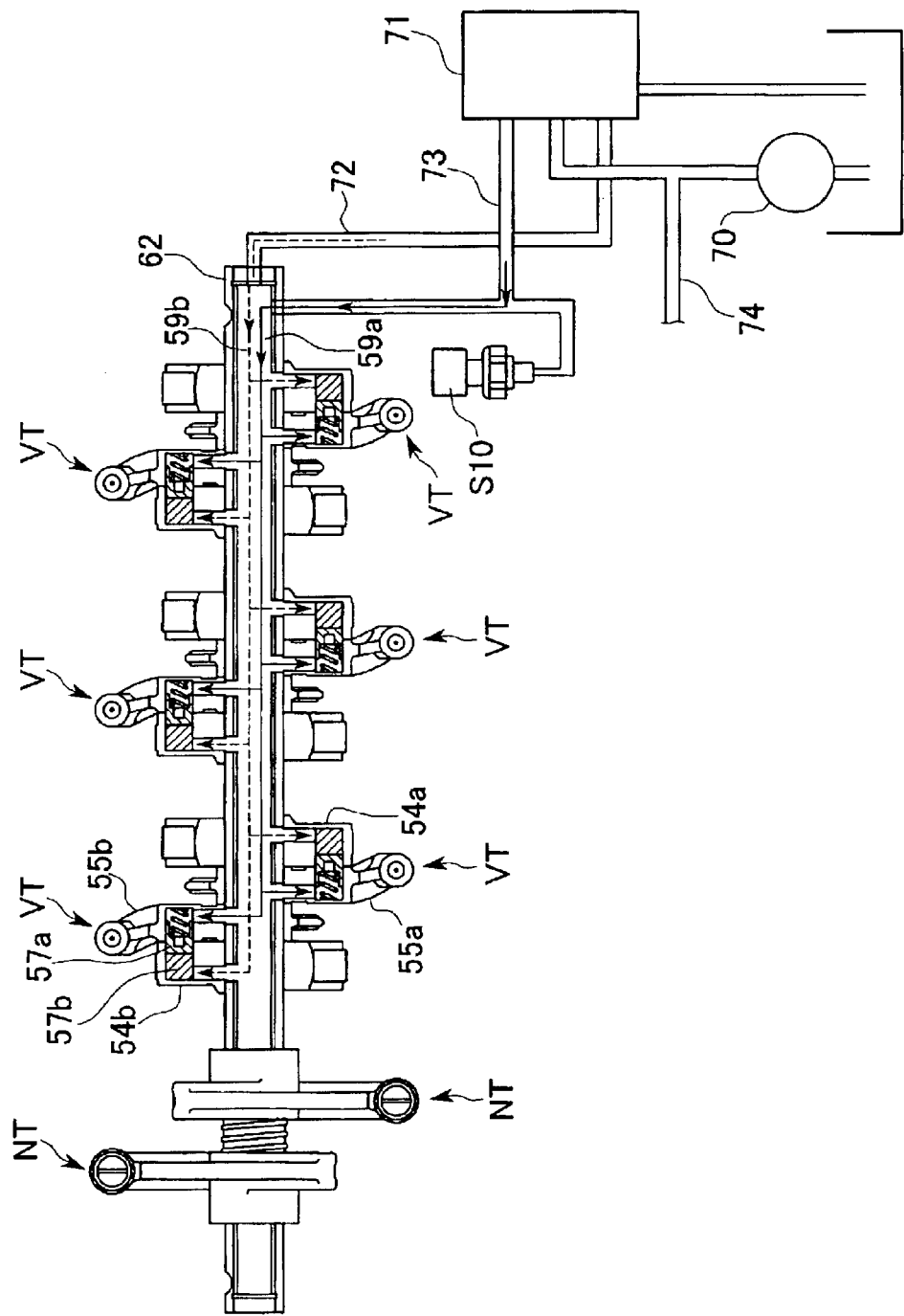
FIG. 4 is an enlarged view of the main part in FIG. 1

As shown in FIG. 4, a passage for deactivation (passage for deactivation execution) 72 branching from the spool valve 71 is connected to the hydraulic passage 59b in the rocker arm shaft 62, and a passage for canceling deactivation (passage for deactivation cancellation) 73 branching from the spool valve 71 is connected to the hydraulic passage 59a. The POIL sensor S10 is connected to the passage for canceling deactivation 73. The POIL sensor S10 monitors hydraulic pressure in the passage for canceling deactivation 73, which exhibits low values during a deactivation operation and exhibits high values during normal operation. The TOIL sensor S11 (shown in FIG. 1) is connected to an oil supplying passage 74 which branches from a passage connecting the outlet of the oil pump 70 and the spool valve 71 and which supplies operating oil to the engine E so as to monitor the temperature of the operating oil.

When the condition for entering into a cylinder deactivation operation, which will be described below, is satisfied, the spool valve 71 is operated in accordance with a signal from the FIECU 11, and hydraulic pressure is applied to the hydraulic chamber 56 via the oil pump 70 and the hydraulic passage 59b in both the intake valve and exhaust valve sides. Subsequently, the pins 57a, which have been bridging the cam lifting rocker arms 54a and 54b and the valve operating rocker arms 55a and 55b together with the disengaging pin 57b, slide toward the valve operating rocker arms 55a and 55b, and the cam lifting rocker arms 54a and 54b and the valve operating rocker arms 55a and 55b are disconnected.

In this state, although the cam lifting rocker arms 54a and 54b are driven by the rotating lift cam 52, the movements are not transmitted to the valve operating rocker arms 55a and 55b which have been disconnected from the cam lifting rocker arms 54a and 54b. As a result, because the valve operating rocker arms 55a and 55b are not driven and the intake valve IV and the respective ports of the exhaust valve EV remain closed, a deceleration deactivation operation of the engine can be performed.

Operation for Switching into Deceleration Deactivation Operation

Figure 5:
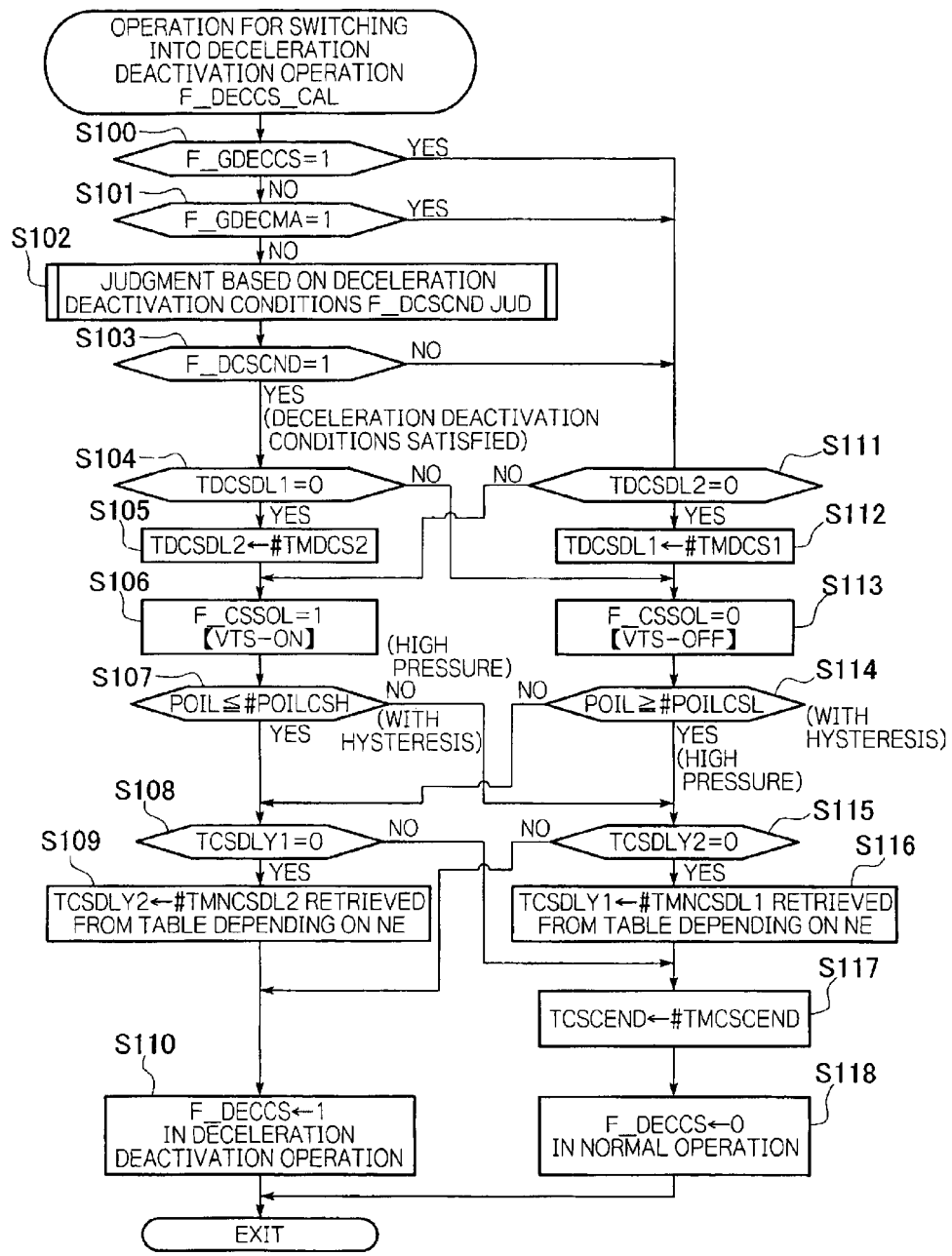
FIG. 5 is a flowchart showing the operation for switching into a deceleration deactivation operation in the embodiment of the present invention.

Now, the operation for switching into a deceleration deactivation operation will be explained with reference to FIG. 5.

The term "deceleration deactivation operation" herein means an engine operation state in which both of the intake and exhaust valves remain in their closing positions by means of the variable valve timing mechanism VT under predetermined conditions during regenerative deceleration, and it is performed in order to reduce engine friction and to increase the energy regenerated during deceleration. In the flowchart shown in FIG. 2, a flag (i.e., cylinder deactivation executing flag F_DECCS) used to alternate the engine operation state between a deceleration deactivation operation and an all-cylinder operation (normal operation) in which all cylinders are active is set and reset at a predetermined period.

In step S100, it is determined whether the value of a flag F_GDECCS is "1". The flag F_GDECCS is provided since cancellation of the cylinder deactivation operation is required when the degree of deceleration is relatively great. When the result of the determination in step S100 is "YES", the operation proceeds to step S111, and when the result is "NO", the operation proceeds to step S101.

In step S101, it is determined whether the value of a flag F_GDECMA (included in the deceleration state determining section) is "1". The flag F_GDECMA is provided since cancellation of regenerative deceleration is required when the degree of deceleration is relatively great. When the result of the determination in step S101 is "YES", the operation proceeds to step S111, and when the result is "NO", the operation proceeds to step S102.

The reason for providing the determination in step S101 is that it is better not to execute the cylinder deactivation operation when stopping of the vehicle has the highest priority. When a braking operation of high deceleration is applied, negative pressure in the master vac is greatly reduced (i.e., the absolute pressure is increased), and subsequently, there is a high probability that the engine operation state may return to normal operation from the cylinder deactivation operation; therefore, the cylinder deactivation operation should be cancelled during high deceleration traveling.

The reason for providing the determination in step S101 is that it is better not to execute the cylinder deactivation operation in order to prevent wheel skidding by a regenerative braking during high deceleration traveling.

In step S102, the operation for judgment whether the conditions permitting the deceleration deactivation operation, which will be explained below, are satisfied is executed, and the operation proceeds to step S103.

In step S103, it is determined whether the value of a flag F_DCSCND, which indicates that the conditions for deceleration deactivation operation are satisfied, is "1". When the result of the determination in step S103 is "NO", which means that the conditions for the deceleration deactivation operation are not satisfied, the operation proceeds to step S111, and when the result is "YES", which means that the conditions for the deceleration deactivation operation are satisfied, the operation proceeds to step S104.

In step S104, it is determined whether the value of a solenoid ON delay timer TDCSDL1, which will be explained below, is "0". When the result of the determination in step S104 is "YES", which means that a predetermined period has passed, the operation proceeds to step S105, and when the result is "NO", which means that a predetermined period has not passed, the operation proceeds to step S113.

In step S105, a predetermined value #TMDCS2 is set in a solenoid OFF delay timer TDCSDL2 for the spool valve 71, then the operation proceeds to step S106. This procedure is performed in order to ensure a certain period of time has passed from completion of the determination in step S103 to completion of the OFF operation of the solenoid for the spool valve 71, when the engine operation is alternated from the deceleration deactivation operation to the normal operation.

In step S106, the flag F_CSSOL of the solenoid for the cylinder deactivation operation is set to "1", i.e., the solenoid for the cylinder deactivation operation in the spool valve 71 is set to be ON, then the operation proceeds to step S107. This flag is set to "1" when the solenoid for the cylinder deactivation operation of the spool valve 71 is set to be ON, and is set to "0" when the solenoid is set to be OFF.

In step S107, it is determined by the POIL sensor S10 whether hydraulic pressure is actually produced after the solenoid for the cylinder deactivation operation was set to be ON. Specifically, it is determined whether or not engine oil pressure POIL is equal to or less than cylinder deactivation permissible oil pressure #POILCSH. When the result of the determination in step S107 is "YES", the operation proceeds to step S108, and when the result is "NO" (there is hysteresis), the operation proceeds to step S115. An oil pressure switch may be provided for the determination instead of the POIL sensor S10.

In step S108, it is determined whether the value of a cylinder deactivation execution delay timer TCSDLY1 is "0" in order to ensure a certain period of time has passed from when the spool valve 71 is switched on to when oil pressure is produced. When the result of the determination in step S108 is "YES", the operation proceeds to step S109, and when the result is "NO", the operation proceeds to step S117.

In step S109, a timer value #TMNCSDL2, which is retrieved from a table depending on the engine running speed NE, is set in a cylinder deactivation cancellation delay timer TCSDLY2. The reason for setting the timer value #TMNCSDL2 depending on the engine running speed NE is that the oil pressure response changes depending on the engine running speed NE. Therefore, the lower the engine running speed NE is, the greater the timer value #TMNCSDL2 is.

In step S110, the cylinder deactivation executing flag F_DECCS is set to "1", which means that the deceleration deactivation operation is executed, and the control operation of this flow is terminated.

In step S111, it is determined whether the value of the solenoid OFF delay timer TDCSDL2 is "0". When the result of the determination in step S111 is "YES", which means that a predetermined period has passed, the operation proceeds to step S112, and when the result is "NO", which means that a predetermined period has not passed, the operation proceeds to step S106.

In step S112, a predetermined value #TMDCS1 is set in the solenoid ON delay timer TDCSDL1 for the spool valve 71, then the operation proceeds to step S113. This procedure is performed in order to ensure a certain period of time has passed from completion of the determination in step S103 to an ON operation of the solenoid for the spool valve 71 in step S106 when the engine operation is alternated from the deceleration deactivation operation to normal operation.

In step S113, the flag F_CSSOL of the solenoid for the cylinder deactivation operation is set to "0", i.e., the solenoid for the cylinder deactivation operation in the spool valve 71 is set to be OFF, then the operation proceeds to step S114.

In step S114, it is determined by the POIL sensor S10 whether hydraulic pressure is actually reduced after the solenoid for the cylinder deactivation operation was set to be OFF. Specifically, it is determined whether or not engine oil pressure POIL is equal to or greater than cylinder deactivation cancellation oil pressure #POILCSL. When the result of the determination in step S117 is "YES", which means that engine oil pressure POIL is at the high pressure side (there is hysteresis), the operation proceeds to step S115, and when the result is "NO", the operation proceeds to step S108. An oil pressure switch may be provided for the determination instead of the POIL sensor S10.

In step S115, it is determined whether the value of the cylinder deactivation cancellation delay timer TCSDLY2 is "0" in order to ensure a certain period of time has passed from when the spool valve 71 is switched off to when oil pressure is reduced. When the result of the determination in step S115 is "YES", the operation proceeds to step S116, and when the result is "NO", the operation proceeds to step S110.

In step S116, a timer value #TMNCSDL1, which is retrieved from a table depending on an engine running speed NE, is set in the cylinder deactivation execution delay timer TCSDLY1, then the operation proceeds to step S117. The reason for setting the timer value #TMNCSDL1 depending on the engine running speed NE is that the oil pressure response changes depending on the engine running speed NE. Therefore, the lower the engine running speed NE is, the greater the timer value #TMNCSDL1 is.

In step S117, a timer value #TMCSCEND is set in a cylinder deactivation compulsory cancellation timer TCSCEND, then the operation proceeds to step S118. The cylinder deactivation compulsory cancellation timer TCSCEND is provided to compulsorily cancel the cylinder deactivation operation when a predetermined period has passed since the beginning of the cylinder deactivation operation.

In step S118, the cylinder deactivation executing flag F_DECCS is set to "0", which means that the normal operation is being executed, and the control operation of this flow is terminated.

Figure 6:
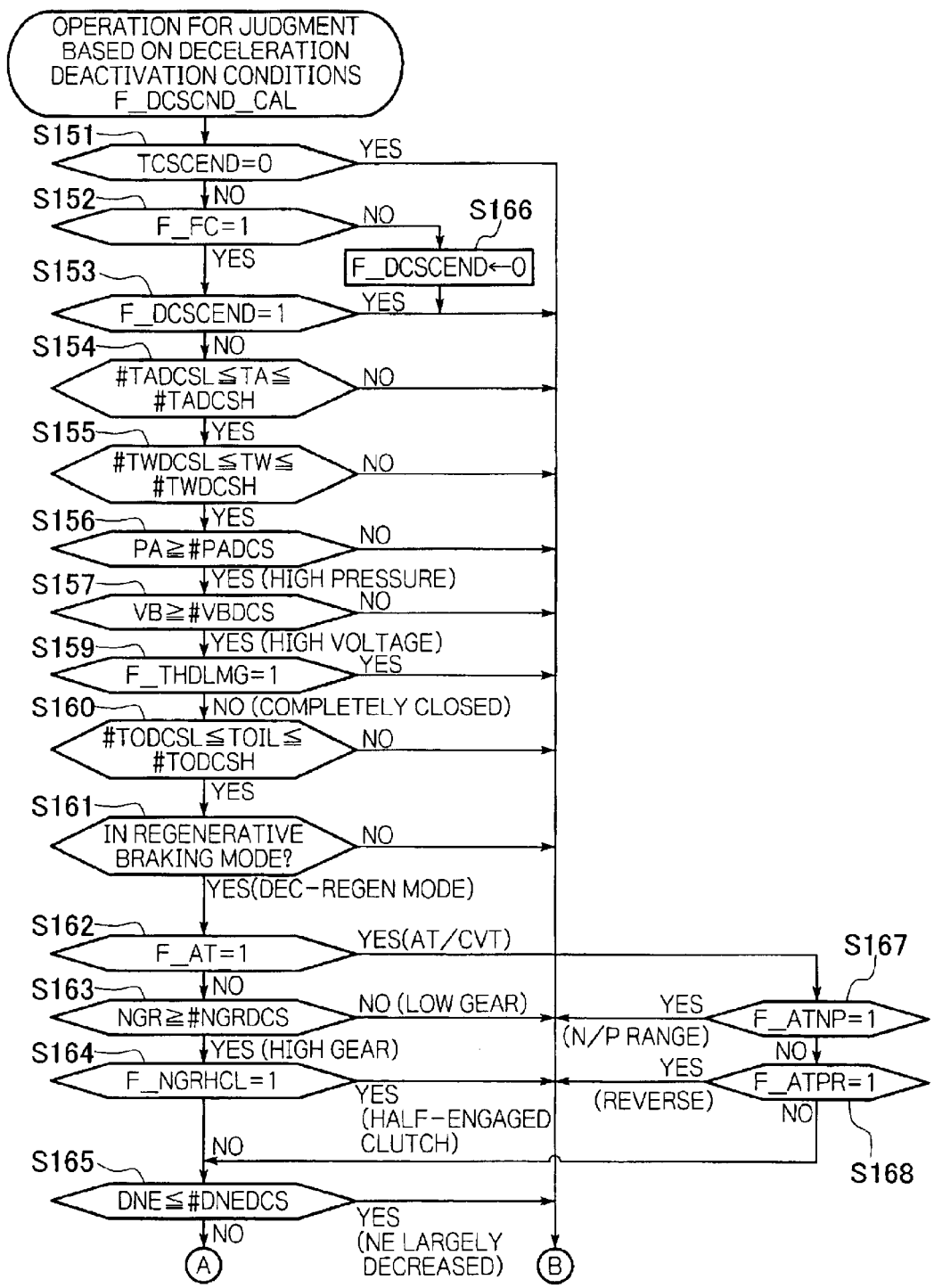
FIG. 6 is a flowchart showing the operation for determining whether the conditions permitting the deceleration deactivation operation are satisfied in the embodiment of the present invention.

Operation for Determining Whether the Conditions Permitting the Deceleration Deactivation Operation are Satisfied Next, the operation for judgment whether the conditions permitting the deceleration deactivation operation are satisfied in step S102 shown in FIG. 5 will be explained with reference to FIGS. 6 to 8. In this operation, the flag F_DCSCND, which indicates that the conditions for deceleration deactivation operation are satisfied, is set or reset by continuously monitoring whether or not the conditions for deceleration deactivation operation are satisfied. This operation will be repeated at a predetermined period.

In step S151, it is determined whether the value of the cylinder deactivation compulsory cancellation timer TCSCEND is "0". When the result of the determination in step S151 is "YES", the operation proceeds to step S184 shown in FIG. 8, and when the result is "NO", the operation proceeds to step S152, because the cylinder deactivation operation should be cancelled when the value of the cylinder deactivation compulsory cancellation timer TCSCEND is "0".

In step S152, it is determined whether the value of the fuel cut-off flag F_FC is "1". When the result of the determination in step S152 is "YES", the operation proceeds to step S153, and when the result is "NO", the operation proceeds to step S166. This procedure is provided because the purpose of the cylinder deactivation operation is to further obtain regenerated energy corresponding to the reduction in engine friction resulting when the fuel supply is stopped during deceleration traveling.

Figure 8:
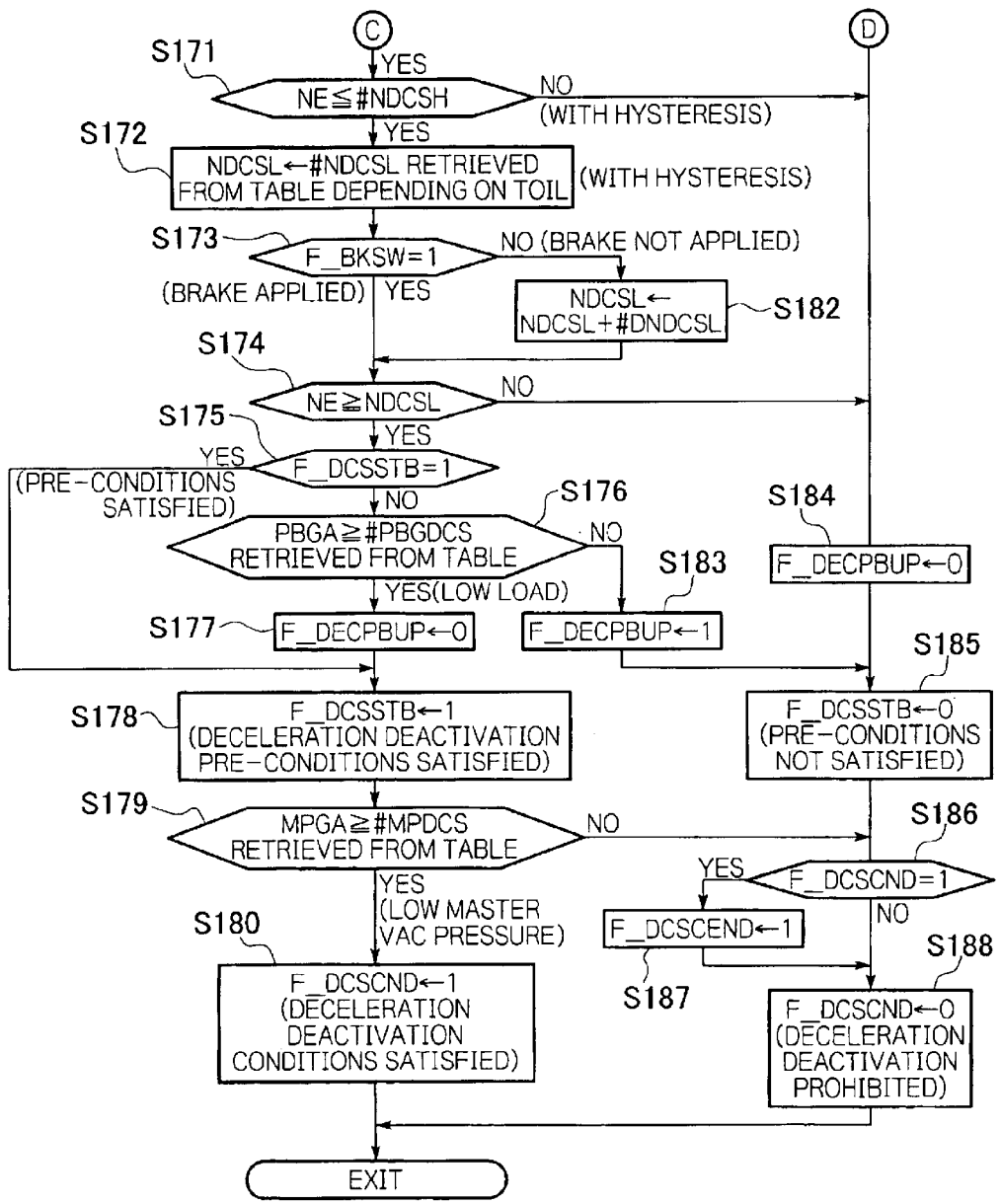
FIG. 8 is a flowchart showing the operation for determining whether the conditions permitting the deceleration deactivation operation are satisfied in the embodiment of the present invention.

In step S166, a cylinder deactivation ending flag F_DCSCEND is set to "0", then the operation proceeds to step S184 shown in FIG. 8.

In step S153, it is determined whether the value of the cylinder deactivation ending flag F_DCSCEND is "1". When the result of the determination in step S153 is "YES", the operation proceeds to step S184 shown in FIG. 8, and when the result is "NO", the operation proceeds to step S154.

In step S154, it is determined whether ambient temperature TA is within a predetermined range, i.e., whether the ambient temperature TA satisfies the following inequality: lowest permissible ambient temperature for cylinder deactivation #TADCSL≦TA≦highest permissible ambient temperature for cylinder deactivation #TADCSH. When it is determined, in step S154, that the ambient temperature TA is within the predetermined range, the operation proceeds to step S155. When it is determined that the ambient temperature TA is out of the predetermined range, the operation proceeds to step S184 shown in FIG. 8. This procedure is provided because the cylinder deactivation operation may make the engine unstable when ambient temperature TA is below the lowest permissible ambient temperature for cylinder deactivation #TADCSL or when the ambient temperature TA is above the highest permissible ambient temperature for cylinder deactivation #TADCSH.

In step S155, it is determined whether cooling water temperature TW is within a predetermined range, i.e., whether cooling water temperature TW satisfies the following inequality:
lowest permissible cooling water temperature for cylinder deactivation #TWDCSL≦TA≦highest permissible cooling water temperature for cylinder deactivation #TWDCSH. When it is determined, in step S155, that the cooling water temperature TW is within the predetermined range, the operation proceeds to step S156. When it is determined that the cooling water temperature TW is out of the predetermined range, the operation proceeds to step S184 shown in FIG. 8. This procedure is provided because the cylinder deactivation operation may make the engine unstable when cooling water temperature TW is below the lowest permissible cooling water temperature for cylinder deactivation

TWDCSL or when the cooling water temperature TW is above the highest permissible cooling water temperature for cylinder deactivation #TWDCSH.

In step S156, it is determined whether ambient pressure PA is equal to or greater than a lowest permissible ambient pressure for cylinder deactivation #PADCS. When the result of the determination in step S156 is "YES", which means that the ambient pressure PA is in higher side, the operation proceeds to step S157, and when the result is "NO", the operation proceeds to step S184 shown in FIG. 8. This procedure is provided because it is undesirable to execute the cylinder deactivation operation when the ambient pressure is relatively low. For example, when the cylinder deactivation operation is executed under such a condition, negative pressure in the master vac for the brake system may not be ensured to be sufficient for the braking operation.

In step S157, it is determined whether voltage VB of the 12-volt auxiliary battery 4 is equal to or greater than a lowest permissible voltage for cylinder deactivation #VBDCS. When the result of the determination in step S157 is "YES", which means that the voltage VB is in greater side, the operation proceeds to step S159, and when the result is "NO", the operation proceeds to step S184 shown in FIG. 8. This procedure is provided because the response of the spool valve 71 is degraded when the voltage VB of the 12-volt auxiliary battery 4 is relatively low. In addition, this procedure is provided in order to protect the auxiliary battery 4 when the voltage thereof is decreased under a low ambient temperature or when the auxiliary battery 4 is deteriorated.

In step S159, it is determined whether the value of an idling indication flag F_THIDLMG is "1". When the result of the determination in step S159 is "YES", which means that the throttle of the engine is not completely closed, the operation proceeds to step S184 shown in FIG. 8, and when the result is "NO", which means that the throttle of the engine is completely closed, the operation proceeds to step S160. This procedure is provided to cancel the cylinder deactivation operation even when the throttle is slightly opened from a completely closed state so that marketability of the vehicle is enhanced.

In step S160, it is determined whether oil temperature TOIL (the temperature of the engine oil) is within a predetermined range, i.e., whether the oil temperature TOIL satisfies the following inequality:
lowest permissible oil temperature for cylinder deactivation #TODCSL≦TOIL≦highest permissible oil temperature for cylinder deactivation #TODCSH. When it is determined, in step S160, that the oil temperature TOIL is within the predetermined range, the operation proceeds to step S161. When it is determined that oil temperature TOIL is out of the predetermined range, the operation proceeds to step S184 shown in FIG. 8. This procedure is provided because the response in alternation between normal operation and the cylinder deactivation operation of the engine may be unstable if the cylinder deactivation operation is executed when the oil temperature TOIL is below the lowest permissible oil temperature for cylinder deactivation #TODCSL or when the oil temperature TOIL is above the highest permissible oil temperature for cylinder deactivation #TODCSH.

In step S161, it is determined whether deceleration regeneration is being performed. When the result of the determination in step S161 is "YES", the operation proceeds to step S162, and when the result is "NO", the operation proceeds to step S184 shown in FIG. 8. This procedure is provided because the purpose of the cylinder deactivation operation is to further obtain regenerated energy corresponding to the reduction in engine friction resulting when the fuel supply is stopped during deceleration traveling.

In step S162, it is determined whether the value of an MT/CVT indication flag F_AT is "1". When the result of the determination in step S162 is "NO", which means that the present vehicle employs an MT (manual transmission), the operation proceeds to step S163, and when the result is "YES", which means that the present vehicle employs an AT (automatic transmission) or a CVT, the operation proceeds to step S167.

In step S167, it is determined whether the value of an in-gear indication flag F_ATNP is "1". When the result of the determination in step S167 is "NO", which means that the vehicle is in driving mode, the operation proceeds to step S168, and when the result is "YES", which means that the transmission is in N (neutral) or P (parking) position, the operation proceeds to step S184 shown in FIG. 8.

In step S168, it is determined whether the value of a reverse position indication flag F_ATPR is "1". When the result of the determination in step S168 is "YES", which means that the transmission is in reverse position, the operation proceeds to step S184 shown in FIG. 8, and when the result is "NO", which means that the transmission is in a position other than the reverse position, the operation proceeds to step S165.

Through the procedures in steps S167 and S168, the cylinder deactivation operation is cancelled in N/P or reverse position.

In step S163, it is determined whether the previous gear position NGR is equal to or higher than a lowest permissible gear position for cylinder deactivation #NGRDCS (e.g., third gear). When the result of the determination in step S163 is "YES", i.e., higher gear position, the operation proceeds to step S164, and when the result is "NO", i.e., lower gear position, the operation proceeds to step S184 shown in FIG. 8. This procedure is provided because the regeneration efficiency is reduced in low gear positions, and to avoid a frequent alternation into the cylinder deactivation operation when the vehicle is in a traffic jam.

In step S164, it is determined whether the value of a half-engaged clutch indication flag F_NGRHCL is "1". When the result of the determination in step S164 is "YES", which indicates a half-engaged clutch state, the operation proceeds to step S184 shown in FIG. 8, and when the result is "NO", the operation proceeds to step S165. By providing this procedure, it is possible to avoid undesirable cylinder deactivation operations which may cause an engine stall when the clutch is placed in a half-engaged state to stop the vehicle, or an insufficient acceleration performance when the clutch is placed in a half-engaged state for gear position shifting to accelerate the vehicle.

In step S165, it is determined whether an engine revolution rate decrease amount DNE is equal to or smaller than a highest permissible engine revolution rate decrease amount for cylinder deactivation #DNEDCS. When the result of the determination in step S165 is "YES", which means that the engine revolution rate is considerably decreased, the operation proceeds to step S184 shown in FIG. 8, and when the result is "NO", the operation proceeds to step S169. This procedure is provided to avoid undesirable cylinder deactivation operations which may cause an engine stall when the engine revolution rate is rapidly decreasing.

Figure 7:
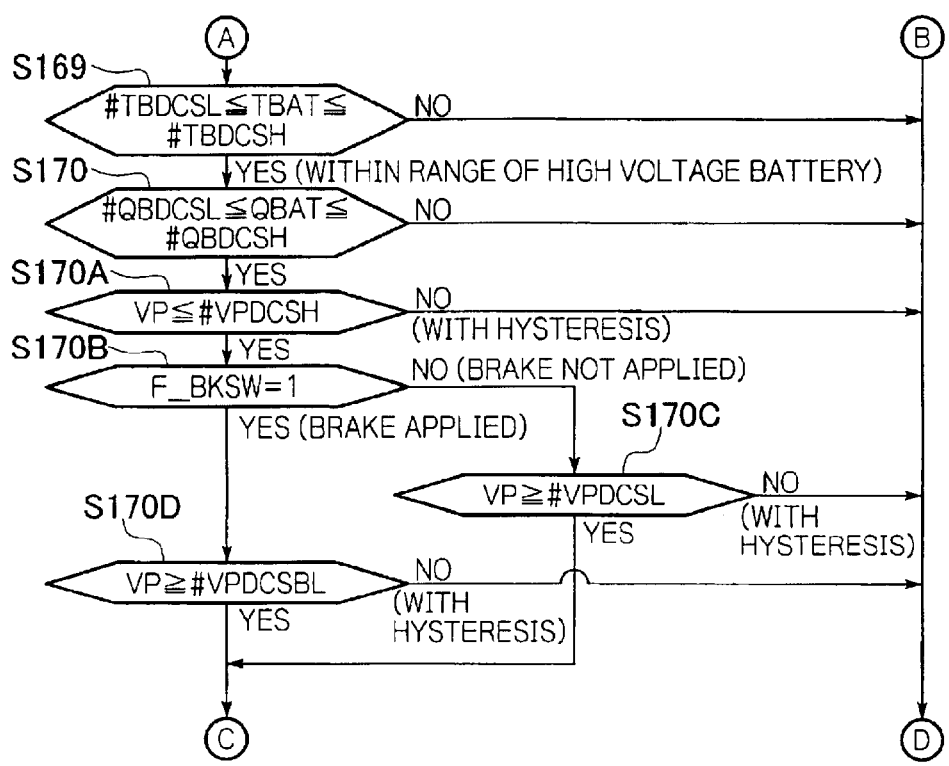
FIG. 7 is a flowchart showing the operation for determining whether the conditions permitting the deceleration deactivation operation are satisfied in the embodiment of the present invention.

In step S169 shown in FIG. 7, it is determined whether battery temperature TBAT of the battery 3 is within a predetermined range, i.e., whether the battery temperature TBAT satisfies the following inequality:
lowest permissible battery temperature for cylinder deactivation #TBDCSL≦TBAT≦highest permissible battery temperature for cylinder deactivation #TBDCSH. When the result of the determination in step S169 is "YES", the operation proceeds to step S170, and when the result is "NO", the operation proceeds to step S184 shown in FIG. 8. This procedure is provided because the cylinder deactivation operation should not be executed when the temperature of the battery 3 is out of the predetermined range in view of protecting the battery.

In step S170, it is determined whether a remaining battery charge QBAT is within a predetermined range, i.e., whether the remaining battery charge QBAT satisfies the following inequality:
lowest permissible remaining battery charge for continuation of cylinder deactivation #QBDCSL≦QBAT≦highest permissible remaining battery charge for continuation of cylinder deactivation #QBDCSH. When it is determined, in step S170, that the remaining battery charge QBAT is within the predetermined range, the operation proceeds to step S170A. When it is determined that the remaining battery charge QBAT is out of the predetermined range, the operation proceeds to step S184 shown in FIG. 8. Accordingly, the cylinder deactivation operation is cancelled when the remaining battery charge QBAT is below the lowest permissible remaining battery charge for cylinder deactivation continuation #QBDCSL, or when the remaining battery charge QBAT is above the highest permissible remaining battery charge for cylinder deactivation continuation #QBDCSH. This procedure is provided because electric energy supplied to the motor M for assisting the engine driving cannot be ensured when the remaining battery charge QBAT is too low, and because regenerated energy cannot be drawn when the remaining battery charge QBAT is too high.

In step S170A, it is determined whether a vehicle speed VP is equal to or below the highest permissible vehicle speed for continuation of cylinder deactivation #VPDCSH. When the result of the determination in step S170A is "YES", the operation proceeds to step S170B, and when the result is "NO" (with hysteresis), the operation proceeds to step S184 shown in FIG. 8.

In step S170B, it is determined whether a brake switch flag F_BKSW is "1". When the result of the determination in step S170B is "YES", which means that the brake of the vehicle is applied, the operation proceeds to step S170D, and when the result is "NO", which means that the brake of the vehicle is not applied, the operation proceeds to step S170C. Note that a brake fluid pressure or the degree of deceleration of the vehicle (i.e., negative acceleration) may be measured to detect a brake activation instead of using the brake switch flag F_BKSW.

In step S170C, it is determined whether the vehicle speed VP is equal to or greater than the lowest permissible vehicle speed for continuation of cylinder deactivation during brake OFF #VPDCSL (e.g., 30 km/h). When the result of the determination in step S170C is "YES", the operation proceeds to step S171 shown in FIG. 8, and when the result is "NO" (with hysteresis), the operation proceeds to step S184 shown in FIG. 8.

In step S170D, it is determined whether the vehicle speed VP is equal to or greater than the lowest permissible vehicle speed for continuation of cylinder deactivation during brake ON #VPDCSBL (e.g., 10 km/h). When the result of the determination in step S170D is "YES", the operation proceeds to step S171 shown in FIG. 8, and when the result is "NO" (with hysteresis), the operation proceeds to step S184 shown in FIG. 8.

The reason of setting the lowest permissible vehicle speed for continuation of cylinder deactivation to be different between when the brake is in the ON state and when the brake is in the OFF state is that the driver of the vehicle may intend to stop the vehicle with high probability when the brake is in the ON state, and the driver may intend to re-accelerate the vehicle when the brake is in the OFF state. Accordingly, the lowest permissible vehicle speed for continuation of cylinder deactivation during brake OFF #VPDCSL is set higher than the lowest permissible vehicle speed for continuation of cylinder deactivation during brake ON #VPDCSBL, whereby the cylinder deactivation operation is more easily executed when the brake is in the ON state than when the brake is in the OFF state, and also the drivability of the vehicle is improved by smoothly reflecting the driver's desire when the driver intends to re-accelerate the vehicle. The above-mentioned lowest permissible vehicle speed for continuation of cylinder deactivation during brake ON #VPDCSBL and lowest permissible vehicle speed for continuation of cylinder deactivation during brake OFF #VPDCSL constitute the reference lowest permissible vehicle speeds.

In step S171, it is determined whether the engine running speed NE is equal to or below a predetermined value, i.e., whether the engine running speed NE satisfies the following inequality:
NE≦highest permissible engine running speed for continuation of cylinder deactivation #NDCSH. When it is determined, in step S171, that the engine running speed NE is equal to or below a predetermined value, the operation proceeds to step S172. When it is determined that the engine running speed NE is above the predetermined value (with hysteresis), the operation proceeds to step S184. This procedure is provided because the cylinder deactivation operation may not be executed, and too much of the operation oil for the cylinder deactivation operation may be consumed due to excessively high oil pressure at high engine revolution rate if the engine revolution rate NE is too high.

In step S172, the lowest permissible engine running speed for continuation of cylinder deactivation NDCSL (a reference engine running speed) is retrieved from a #NDCSL table in accordance with the oil temperature TOIL, and the operation proceeds to step S173. The reason for retrieving the lowest permissible engine running speed for continuation of cylinder deactivation NDCSL in such a way, i.e., in accordance with the oil temperature TOIL is that the higher the oil temperature, i.e., the temperature of the engine oil, is, the lower the viscosity of the engine oil is; then, it becomes difficult to apply sufficient pressure, and it is necessary to cancel the deactivation operation earlier, i.e., before the engine running speed becomes too low. By this procedure, an accurate control is realized in accordance with the oil temperature TOIL, i.e., in accordance with the thermal state of the engine. Note that the lowest permissible engine running speed for continuation of cylinder deactivation #NDCSL has hysteresis, and the higher the oil temperature TOIL is, the higher #NDCSL is set.

Note that, instead of the oil temperature TOIL as mentioned above, the temperature of cooling water of the engine or the temperature of the engine itself may be used for setting the lowest permissible engine running speed for continuation of cylinder deactivation #NDCSL.

In step S173, it is determined whether a brake switch flag F_BKSW is "1". When the result of the determination in step S173 is "YES", which means that the brake of the vehicle is applied, the operation proceeds to step S174, and when the result is "NO", which means that the brake of the vehicle is not applied, the operation proceeds to step S182. Note that, as mentioned above, a brake fluid pressure or the degree of deceleration of the vehicle (i.e., negative acceleration) may be measured to detect a brake activation instead of using the brake switch flag F_BKSW.

In step S182, the lowest permissible engine running speed for continuation of cylinder deactivation NDCSL is increased by a predetermined amount of #DNDCSL, and the operation proceeds to step S174. By detecting, to some extent, that the driver intends to stop the vehicle through detecting a brake activation, and by increasing the lowest permissible engine running speed for continuation of cylinder deactivation NDCSL by the predetermined amount of #DNDCSL, the cylinder deactivation operation is more easily executed when the brake is in the ON state than when the brake is in the OFF state, whereby it is possible to smoothly reflect the driver's desire when the driver intends to re-accelerate the vehicle, and thus drivability can be improved.

Note that if the lowest permissible engine running speed for continuation of cylinder deactivation NDCSL can be changed, various ways are possible, for example, the lowest permissible engine running speed for continuation of cylinder deactivation NDCSL may be corrected using multiplying coefficients, or a map may be made for the NDCSL, instead of increasing the lowest permissible engine running speed for continuation of cylinder deactivation NDCSL by an amount of #DNDCSL.

In step S174, it is determined whether the engine running speed NE is equal to or above the lowest permissible engine running speed for continuation of cylinder deactivation NDCSL. When the result of the determination in step S174 is "YES", the operation proceeds to step S175, and when the result is "NO", the operation proceeds to step S184.

In step S175, it is determined whether the value of the cylinder deactivation stand-by flag F_DCSSTB is "1". This flag is set to "1" in step S178 when pre-deactivation conditions are satisfied, and set to "0" in step S185 when the pre-deactivation conditions are not satisfied. When the result of the determination in step S174 is "YES", the operation proceeds to step S178, and when the result is "NO", the operation proceeds to step S176.

In step S176, it is determined whether intake negative pressure PBGA is higher (i.e., closer to atmospheric pressure) than a permissible negative pressure for cylinder deactivation #PBGDCS. The permissible negative pressure for cylinder deactivation #PBGDCS is retrieved from a table which was defined in accordance with the engine running speed NE such that the greater the engine running speed NE, the less (closer to vacuum) the permissible negative pressure #PBGDCS is.

This procedure is provided in order not to immediately execute the cylinder deactivation operation, but to execute the operation after utilizing the intake negative pressure for ensuring negative pressure in the master vac when the load of the engine is considerably great, i.e., the intake negative pressure is lower (closer to vacuum) than the permissible negative pressure #PBGDCS. When the result of the determination in step S176 is "YES" (i.e., low load), the operation proceeds to step S177, and when the result is "NO" (i.e., high load), the operation proceeds to step S183. In step S183, a deceleration intake negative pressure increasing flag F_DECPBUP is set to "1", and then the operation proceeds to step S185. When the value of the flag F_DECPBUP is "1", the secondary air passage 33 is closed under certain conditions, and when the value of the flag F_DECPBUP is "0", the secondary air passage 33 is opened under certain conditions.

In other words, when it is determined, in step S176, that the engine is under a high load condition, the secondary air passage 33 is closed (step S1183) because the negative pressure is insufficient, the cylinder deactivation operation is not started (step S188), and when it is determined, in step S176, that the intake negative pressure PBGA has reached a predetermined value, the control operation is triggered to proceed to steps S177 and S180, and then the pre-deactivation conditions are deemed to be satisfied, i.e., the value of the flag F_DCSCND, which indicates that the conditions for deceleration deactivation operation are satisfied, is set to "1".

In step S177, the deceleration intake negative pressure increasing flag F_DECPBUP is set to "0", and then the operation proceeds to step S178. In step S178, because the pre-deactivation conditions are satisfied, the cylinder deactivation stand-by flag F_DCSSTB is set to "1", and then the operation proceeds to step S179.

In step S179, it is determined whether the master vac negative pressure MPGA is equal to or lower than (closer to vacuum) the permissible negative pressure for continuation of cylinder deactivation #MPDCS. The permissible negative pressure for continuation of cylinder deactivation #MPDCS is retrieved from a table which was defined depending on the vehicle speeds VP such that the greater the vehicle speed VP, the lower (closer to vacuum) the permissible negative pressure #MPDCS is. The permissible negative pressure #MPDCS is preferably determined in accordance with the kinetic energy of the vehicle, i.e., the vehicle speed, because the master vac negative pressure MPGA is used to stop the vehicle.

When it is determined, in step S179, that the master vac negative pressure MPGA is lower than the permissible negative pressure for continuation of cylinder deactivation #MPDCS, which means that the master vac negative pressure MPGA is closer to vacuum, the operation proceeds to step S180. When it is determined, in step S179, that the master vac negative pressure MPGA is higher than the permissible negative pressure for continuation of cylinder deactivation #MPDCS, which means that the master vac negative pressure MPGA is closer to atmospheric pressure, the operation proceeds to step S186. This procedure is provided because it is undesirable to continue the cylinder deactivation operation when the master vac negative pressure MPGA is not sufficiently low.

In step S180, the flag F_DCSCND, which indicates that the conditions for deceleration deactivation operation are satisfied, is set to "1", and then the control operation is terminated.

In step S184, the deceleration intake negative pressure increasing flag F_DECPBUP is set to "0", and then the operation proceeds to step S185.

In step S185, because the pre-deactivation conditions are not satisfied, the cylinder deactivation stand-by flag F_DCSSTB is set to "0", and then the operation proceeds to step S186.

In step S186, it is determined whether the value of the flag F_DCSCND, which indicates that the conditions for deceleration deactivation operation are satisfied, is "1". When the result of the determination is "YES", the operation proceeds to step S187, and when the result is "NO", the operation proceeds to step S188.

In step S187, a cylinder deactivation ending flag F_DCSCEND is set to "1", and then the operation proceeds to step S188.

In step S188, the flag F_DCSCND, which indicates that the conditions for deceleration deactivation operation are satisfied, is set to "0", and then the control operation is terminated.

Operation for Detecting POIL Sensor Failure

Figure 9:
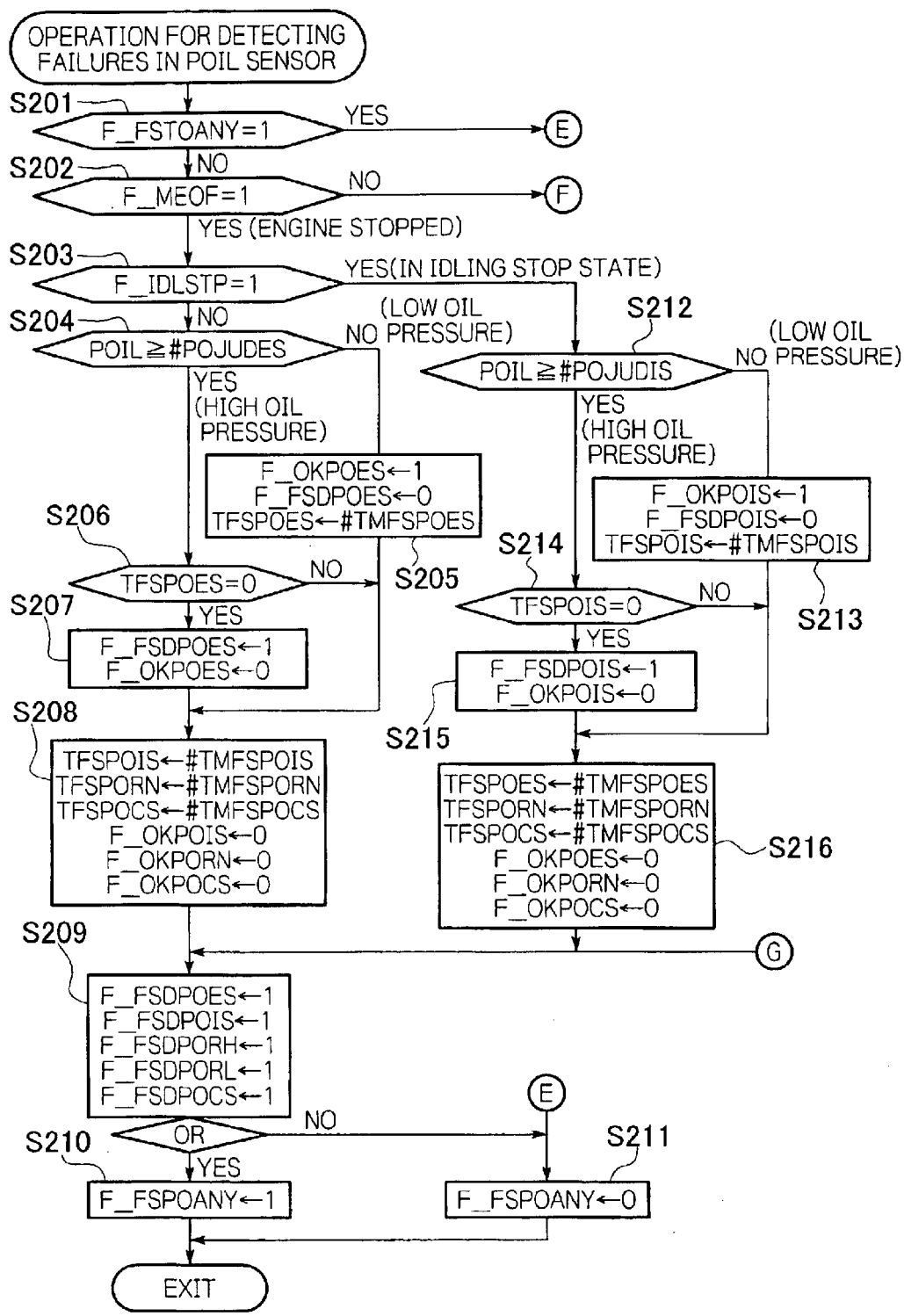
FIG. 9 is a flowchart showing the operation for detecting failures of a POIL sensor in the embodiment of the present invention.

Next, the operation for detecting POIL sensor failure will be explained with reference to FIGS. 9 and 10. This operation is provided primarily for detecting failures in the POIL sensor S10 by continuously monitoring the output of the POIL sensor S10. More specifically, in this operation, the POIL sensor S10 is monitored for detecting failures thereof in each case of engine stall, idle stop operation, deceleration deactivation operation, and normal operation, and a failure flag F_FSPOANY is set to "1" when failures are detected, and is set to "0" when failures are not detected. Note that this operation is repeated at a predetermined period. The idle stop operation is defined as a mode in which the engine is stopped when predetermined conditions are satisfied, and the engine is re-started when the conditions are not satisfied.

In step S201, it is determined whether the value of a TOIL sensor failure flag F_FSTOANY is "1". When the result of the determination is "YES", which means that the TOIL sensor S11 has failed, the operation proceeds to step S211, and when the result is "NO", which means that the TOIL sensor S11 has not failed, the operation proceeds to step S202.

In step S211, the POIL sensor failure flag is set to "0", and the operation is terminated. This procedure is provided not to detect failures of POIL sensor S10 when the TOIL sensor S11 has failed.

In step S202, it is determined whether the value of an engine stall flag F_MEOF is "1". When the result of the determination is "YES", which means that the engine is in a stalled state, the operation proceeds to step S203, and when the result is "NO", which means that the engine is in a starting state, the operation proceeds to step S217.

In step S203, it is determined whether the value of an idling stop flag F_IDLSTP is "1". When the result of the determination in step S203 is "YES", which means that the engine is in an idling stopped state, the operation proceeds to step S212, and when the result is "NO", which means that the engine is not in an idling stopped state, the operation proceeds to step S204.

In step S204, it is determined whether the value of a the output POIL of the POIL sensor is equal to or greater than a threshold at engine stall #POJUDES. When the result of the determination is "YES", which means that the output POIL is high pressure, the operation proceeds to step S206, and when the result is "NO", which means that the output POIL is low pressure, the operation proceeds to step S205.

In step S205, an oil pressure normal flag at engine stall F_OKPOES is set to "1", an oil pressure abnormal flag at engine stall F_FSDPOES is set to "0", and a predetermined value #TMFSPOES is set in a failure detection confirmation timer at engine stall TFSPOES, and then the operation proceeds to step S208.

If measured oil pressure at engine stall is normal, the oil pressure normal flag at engine stall F_OKPOES is set to "1", and the oil pressure abnormal flag at engine stall F_FSDPOES is set to "0", and if measured oil pressure at engine stall is abnormal, the oil pressure normal flag at engine stall F_OKPOES is set to "0", and the oil pressure abnormal flag at engine stall F_FSDPOES is set to "1".

In step S206, it is determined whether the value of failure detection confirmation timer at engine stall TFSPOES is "0". When the result of the determination is "YES", the operation proceeds to step S207, and when the result is "NO", the operation proceeds to step S208.

In step S207, the oil pressure abnormal flag at engine stall F_FSDPOES is set to "1", and the oil pressure normal flag at engine stall F_OKPOES is set to "0", and the operation proceeds to step S208.

If the failure detection confirmation timer at engine stall TFSPOES continuously indicates that the determination in step S204 is "YES", which means that the oil pressure is high, for a predetermined period, it is deemed to be abnormal.

In step S208, a predetermined value #TMFSPOIS is set in a failure detection confirmation timer at idling stop TFSPOIS, a predetermined value #TMFSPORN is set in a failure detection confirmation timer at normal operation TFSPORN, a predetermined value #TMFSPOCS is set in a failure detection confirmation timer at cylinder deactivation TFSPOCS, an oil pressure normal flag at idling stop F_OKPOIS is set to "0", an oil pressure normal flag at normal operation F_OKPORN is set to "0", and an oil pressure normal flag at cylinder deactivation F_OKPOCS is set to "0", and then the operation proceeds to step S209.

The oil pressure normal flag at idling stop F_OKPOIS is set to "1" when the measured oil pressure at idling stop is normal, and is set to "0" when the measured oil pressure is abnormal. The oil pressure normal flag at normal operation F_OKPORN is set to "1" when the measured oil pressure at normal operation is normal, and is set to "0" when the measured oil pressure at normal operation is abnormal. The oil pressure normal flag at cylinder deactivation F_OKPOCS is set to "1" when the measured oil pressure at cylinder deactivation is normal, and is set to "0" when the measured oil pressure is abnormal.

In step S209, it is determined whether the value of any one of the oil pressure abnormal flag at engine stall F_FSDPOES, an oil pressure abnormal flag at idling stop F_FSDPOIS, an oil pressure abnormally high flag at normal operation F_FSDPORH, an oil pressure abnormally low flag at normal operation F_FSDPORL, and an oil pressure abnormal flag at cylinder deactivation F_FSDPOCS, is "1". When the result of the determination is "YES", the operation proceeds to step S210, and when the result is "NO", the operation proceeds to step S211.

The oil pressure abnormal flag at idling stop F_FSDPOIS is set to "1" when the measured oil pressure at idling stop is abnormal, and is set to "0" when the measured oil pressure is normal. The oil pressure abnormally high flag at normal operation F_FSDPORH is set to "1" when the measured oil pressure at normal operation is abnormal in a high pressure side, i.e., greater than an upper threshold, and is set to "0" when the measured oil pressure is normal. The oil pressure abnormally low flag at normal operation F_FSDPORL is set to "1" when the measured oil pressure at normal operation is abnormal in a low pressure side, i.e., smaller than a lower threshold, and is set to "0" when the measured oil pressure is normal. The oil pressure abnormal flag at cylinder deactivation F_FSDPOCS is set to "1" when the measured oil pressure at cylinder deactivation is abnormal, and is set to "0" when the measured oil pressure is normal.

In step S210, because the POIL sensor S10 has failed in any case, a failure flag F_FSPOANY is set to "1", and the operation is terminated.

In step S211, because the POIL sensor S10 has not failed in any case, a failure flag F_FSPOANY is set to "0", and the operation is terminated.

In step S212, it is determined whether the output POIL of the POIL sensor is equal to or greater than a threshold at idling stop #POJUDIS. When the result of the determination is "YES", which means that the output POIL is greater than the threshold #POJUDIS, the operation proceeds to step S214, and when the result is "NO", which means that the output POIL is smaller than the threshold #POJUDIS, the operation proceeds to step S213.

In step S213, the oil pressure normal flag at idling stop F_OKPOIS is set to "1", the oil pressure abnormal flag at idling stop F_FSDPOIS is set to "0", and a predetermined value #TMFSPOIS is set in the failure detection confirmation timer at idling stop TFSPOIS, and then the operation proceeds to step S216.

In step S214, it is determined whether the value of the failure detection confirmation timer at idling stop TFSPOIS is "0". When the result of the determination is "YES", the operation proceeds to step S215, and when the result is "NO", the operation proceeds to step S214.

In step S215, the oil pressure abnormal flag at idling stop F_FSDPOIS is set to "1", and the oil pressure normal flag at idling stop F_OKPOIS is set to "0", and then the operation proceeds to step S216.

If the failure detection confirmation timer at idling stop TFSPOIS continuously indicates that the determination in step S212 is "YES", which means that the oil pressure is high, for a predetermined period, it is deemed to be abnormal.

In step S216, a predetermined value #TMFSPOES is set in a failure detection confirmation timer at engine stall TFSPOES, a predetermined value #TMFSPORN is set in a failure detection confirmation timer at normal operation TFSPORN, a predetermined value #TMFSPOCS is set in a failure detection confirmation timer at cylinder deactivation TFSPOCS, an oil pressure normal flag at engine stall F_OKPOES is set to "0", an oil pressure normal flag at normal operation F_OKPORN is set to "0", and an oil pressure normal flag at cylinder deactivation F_OKPOCS is set to "0", and then the operation proceeds to step S209.

In step S217, it is determined whether the value of the cylinder deactivation solenoid flag F_CSSOL is "1". When the result of the determination is "YES", the operation proceeds to step S229, and when the result of the determination is "NO", the operation proceeds to step S218.

In step S218, a map value POILMAPN is retrieved from a #POIL map, and the operation proceeds to step S219. The #POIL map is defined by the oil temperature TOIL measured by the TOIL sensor S11 and engine revolution rate NE.

In step S219, an upper threshold at normal operation #POJUDRH is calculated by adding a high pressure side offset amount #DPOILMH for failure judgement to the map value POILMAPN, and a lower threshold at normal operation #POJUDRL is calculated by subtracting a low pressure side offset amount #DPOILML for failure judgement from the map value POILMAPN, and then the operation proceeds to step S220.

Figure 13:
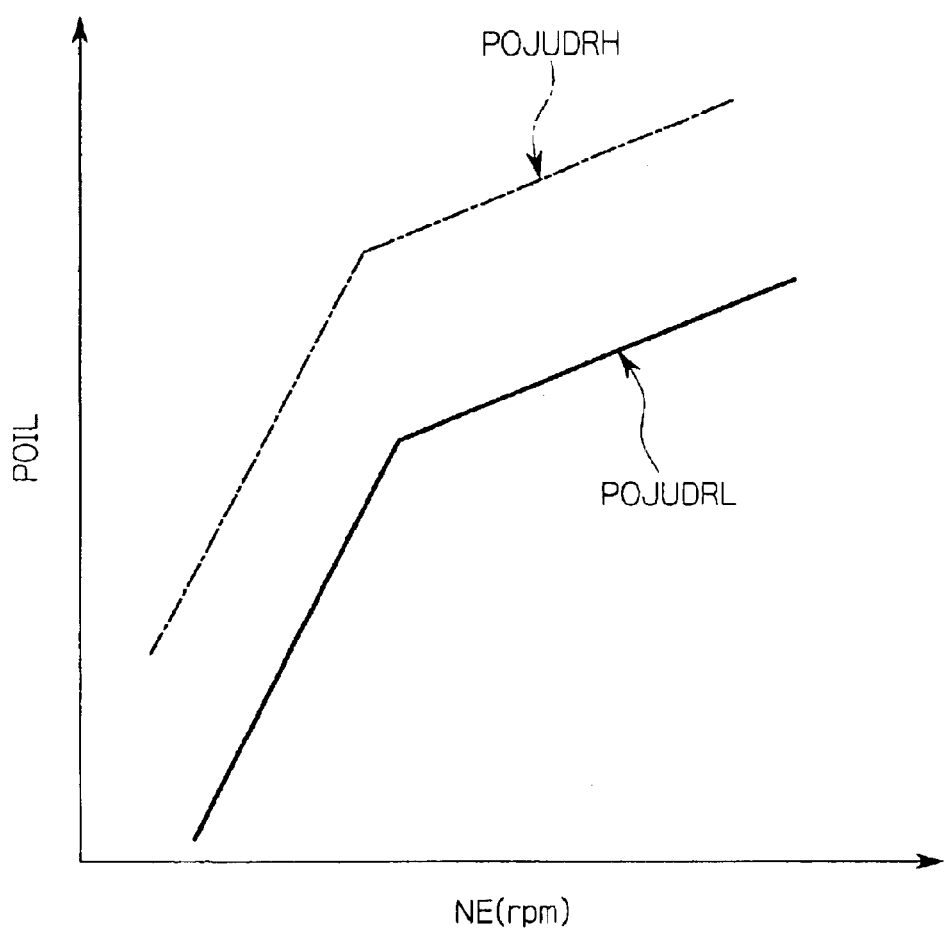
FIG. 13 is a graph showing a relationship between engine revolution rate and the output of the POIL sensor.

Accordingly, as shown in FIG. 13, if the output of the POIL sensor S10, in accordance with the engine revolution rate NE, falls in a predetermined width, i.e., between the upper threshold at normal operation POJUDRH and the lower threshold at normal operation POJUDRL, it is deemed to be normal.

In step S220, it is determined whether the output POIL of the POIL sensor is equal to or greater than a threshold at normal operation #POJUDRH. When the result of the determination is "YES", which means that the output POIL is greater than the threshold #POJUDRH, the operation proceeds to step S223, and when the result is "NO", which means that the output POIL is smaller than the threshold #POJUDRH, the operation proceeds to step S221.

In step S223, it is determined whether the value of the failure detection confirmation timer at normal operation TFSPORN is "0". When the result of the determination is "YES", the operation proceeds to step S225, and when the result is "NO", the operation proceeds to step S226.

In step S225, the oil pressure abnormally high flag at normal operation F_FSDPORH is set to "1", oil pressure normal flag at normal operation F_OKPORN is set to "0", and the oil pressure abnormally low flag at normal operation F_FSDPORL is set to "0", and then the operation proceeds to step S226.

If the failure detection confirmation timer at normal operation TFSPORN continuously indicates that the determination in step S220 is "YES", which means that the oil pressure is high, for a predetermined period, it is deemed to be abnormal.

In step S226, a predetermined value #TMFSPOES is set in a failure detection confirmation timer at engine stall TFSPOES, a predetermined value #TMFSPOIS is set in a failure detection confirmation timer at idling stop TFSPOIS, a predetermined value #TMFSPOCS is set in a failure detection confirmation timer at cylinder deactivation TFSPOCS, the oil pressure normal flag at engine stall F_OKPOES is set to "0", the oil pressure normal flag at idling stop F_OKPOIS is set to "0", and the oil pressure normal flag at cylinder deactivation F_OKPOCS is set to "0", and then the operation proceeds to step S209.

In step S221, it is determined whether the output POIL of the POIL sensor is equal to or smaller than a threshold at normal operation #POJUDRL. When the result of the determination is "YES", which means that the output POIL is smaller than the threshold #POJUDRL, the operation proceeds to step S227, and when the result is "NO", which means that the output POIL is greater than the threshold #POJUDRL, the operation proceeds to step S222.

In step S222, the oil pressure normal flag at normal operation F_OKPORN is set to "1", the oil pressure abnormally high flag at normal operation F_FSDPORH is set to "0", the oil pressure abnormally low flag at normal operation F_FSDPORL is set to "0", and a predetermined value #TMFSPORN is set in the failure detection confirmation timer at normal operation TFSPORN, and then the operation proceeds to step S226.

In step S227, it is determined whether the value of the failure detection confirmation timer at normal operation TFSPORN is "0". When the result of the determination is "YES", the operation proceeds to step S228, and when the result is "NO", the operation proceeds to step S228.

In step S228, the oil pressure abnormally low flag at normal operation F_FSDPORL is set to "1", oil pressure normal flag at normal operation F_OKPORN is set to "0", and the oil pressure abnormally high flag at normal operation F_FSDPORH is set to "0", and then the operation proceeds to step S226.

If the failure detection confirmation timer at normal operation TFSPORN continuously indicates that the determination in step S221 is "YES", which means that the oil pressure is low, for a predetermined period, it is deemed to be abnormal.

In step S229, it is determined whether the output POIL of the POIL sensor is equal to or greater than a threshold at cylinder deactivation #POJUDCS. When the result of the determination is "YES", which means that the output POIL is greater than the threshold #POJUDCS, the operation proceeds to step S231, and when the result is "NO", which means that the output POIL is smaller than the threshold #POJUDCS, the operation proceeds to step S230.

In step S230, the oil pressure normal flag at cylinder deactivation F_OKPOCS is set to "1", the oil pressure abnormal flag at cylinder deactivation F_FSDPOCS is set to "0", and a predetermined value #TMFSPOCS is set in the failure detection confirmation timer at cylinder deactivation TFSPOCS, and then the operation proceeds to step S233.

In step S231, it is determined whether the value of the failure detection confirmation timer at cylinder deactivation TFSPOCS is "0". When the result of the determination is "YES", the operation proceeds to step S232, and when the result is "NO", the operation proceeds to step S233.

In step S232, the oil pressure abnormally low flag at cylinder deactivation F_FSDPOCS is set to "1", and oil pressure normal flag at cylinder deactivation F_OKPOCS is set to "0", and then the operation proceeds to step S233.

If the failure detection confirmation timer at cylinder deactivation TFSPOCS continuously indicates that the determination in step S229 is "YES", which means that the oil pressure is high, for a predetermined period, it is deemed to be abnormal.

In step S233, a predetermined value #TMFSPOES is set in a failure detection confirmation timer at engine stall TFSPOES, a predetermined value #TMFSPOIS is set in a failure detection confirmation timer at idling stop TFSPOIS, a predetermined value #TMFSPORN is set in a failure detection confirmation timer at normal operation TFSPORN, the oil pressure normal flag at engine stall F_OKPOES is set to "0", the oil pressure normal flag at idling stop F_OKPOIS is set to "0", and an oil pressure normal flag at normal operation F_OKPORN is set to "0", and then the operation proceeds to step S209.

Accordingly, when it is determined through the above operation that there is a failure, the failure is due to an abnormal output of the POIL sensor S10; thus, a failure in the POIL sensor S10 or a malfunction of the spool valve 71 can be detected.

Operation for Detecting Failure in Deactivated Cylinders

Figure 15:
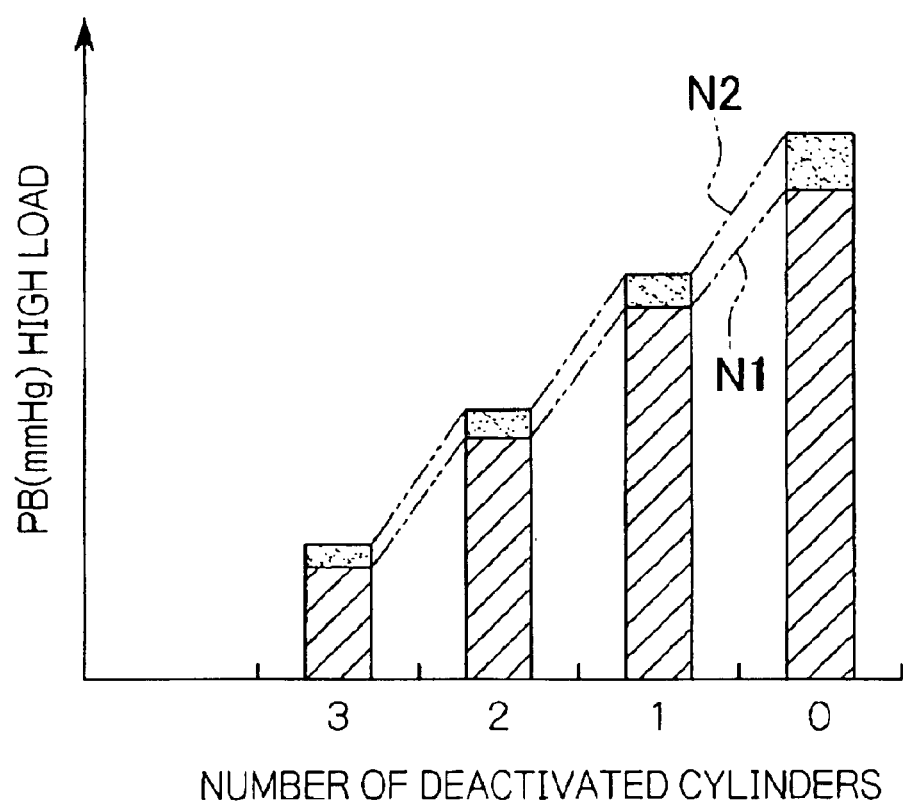
FIG. 15 is a graph showing a relationship between the number of the deactivated cylinders and the negative pressure in the air-intake passage.

Next, the operation for detecting failure in deactivated cylinders will be explained below with reference to the flowchart shown in FIG. 11. This operation is provided for detecting the failure such that the cylinder deactivation operation cannot be executed during deceleration. More specifically, when the output of the POIL sensor S10 is normal during deceleration, the intake passage negative pressure PB is below (closer to vacuum) a predetermined reference pressure. As shown in FIG. 15, in the cylinder deactivatable engine of this embodiment in which three cylinders are deactivated, the intake passage negative pressure is determined in accordance with the engine revolution rate NE (N1=1500 rpm, N2=2500 rpm). The intake passage negative pressure is lower (closer to vacuum) in an engine in which two cylinders are deactivated, the intake passage negative pressure is further lower (closer to vacuum) in an engine in which one cylinder is deactivated, and the intake passage negative pressure is further lower (closer to vacuum) in an engine in which no cylinder is deactivated. Accordingly, when the three cylinders are not properly deactivated in this embodiment, the intake passage negative pressure PB is lower (closer to vacuum) than when the three cylinders are deactivated. By using this principle, not only can the failures of deactivatable cylinders be detected, but also the number of failed cylinders can be determined. Note that the operation explained below will be repeated in a predetermined period.

Figure 11:
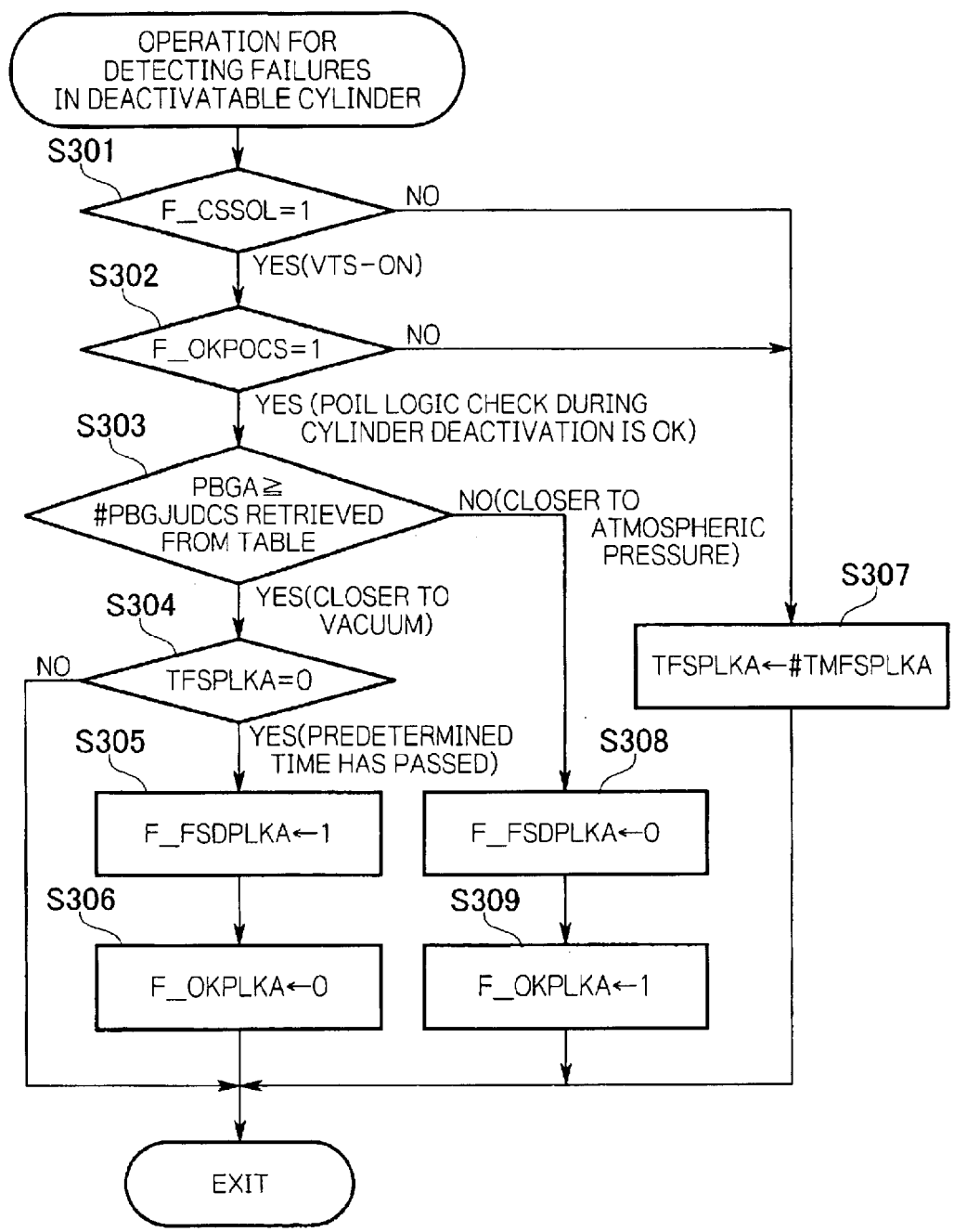
FIG. 11 is a flowchart showing the operation for detecting failures of deactivated cylinders in the embodiment of the present invention.

In step S301 shown in FIG. 11, it is determined whether the value of the cylinder deactivation solenoid flag F_CSSOL is "1". When the result of the determination is "YES", the operation proceeds to step S302, and when the result of the determination is "NO", the operation proceeds to step S307.

In step S307, a predetermined value #TMFSPLKA, i.e., a deactivatable piston fixation detection time is set in a deactivatable piston fixation detection timer TFSPLKA, and the operation is terminated.

In step S302, it is determined whether the value of the oil pressure normal flag at cylinder deactivation F_OKPOCS is "1". When the result of the determination is "YES", which means that the result of theoretical check for the POIL sensor during cylinder deactivation is OK, the operation proceeds to step S303, and when the result of the determination is "NO", the operation proceeds to step S307.

In step S303, it is determined whether the intake passage negative pressure PB is equal to or below a retrieved value #PBGJUDCS (a threshold). When the result of the determination is "YES", which means that there are non-deactivated cylinders due to failures, i.e., the intake passage negative pressure is below (closer to vacuum) the reference value, the operation proceeds to step S304, and the result of the determination is "NO", which means that there is no non-deactivated cylinder due to failures, i.e., the intake passage negative pressure is above (closer to atmosphere) the reference value, the operation proceeds to step S308.

The retrieved value #PBGJUDCS is calculated using interpolation, depending on the atmospheric pressure, between values for low altitude and values for high altitude. In this embodiment, three cylinder out of four cylinders can be deactivated; however, if the number of deactivatable cylinders is different, the above value #PBGJUDCS may, of course, be changed.

In step S304, it is determined whether the value of the deactivatable piston fixation detection timer TFSPLKA is "0". When the result of the determination is "YES", which means that a predetermined time has passed, the operation proceeds to step S305, and when the result of the determination is "NO", the above operation is repeated.

In step S305, it is determined whether the value of a deactivatable cylinder fixation indication flag F_FSDPLKA is set to "1". In step S306, a deactivatable cylinder operation detection flag F_OKPLKA is set to "1", and the operation is terminated.

The deactivatable cylinder fixation indication flag F_FSDPLKA is set to "1"when the deactivatable cylinders are fixed, and is set to "0" when the deactivatable cylinders properly operate. The deactivatable cylinder operation detection flag F_OKPLKA is set to "1" when the deactivatable cylinders properly operate, and is set to "0" when the deactivatable cylinders are fixed.

As explained above, if the deactivatable piston fixation detection timer TFSPLKA continuously indicates that the determination in step S303 is "YES", which means that the deactivatable cylinders are fixed, for a predetermined period, it is deemed that there are failures.

Next, the operation is more specifically explained.

Figure 12:
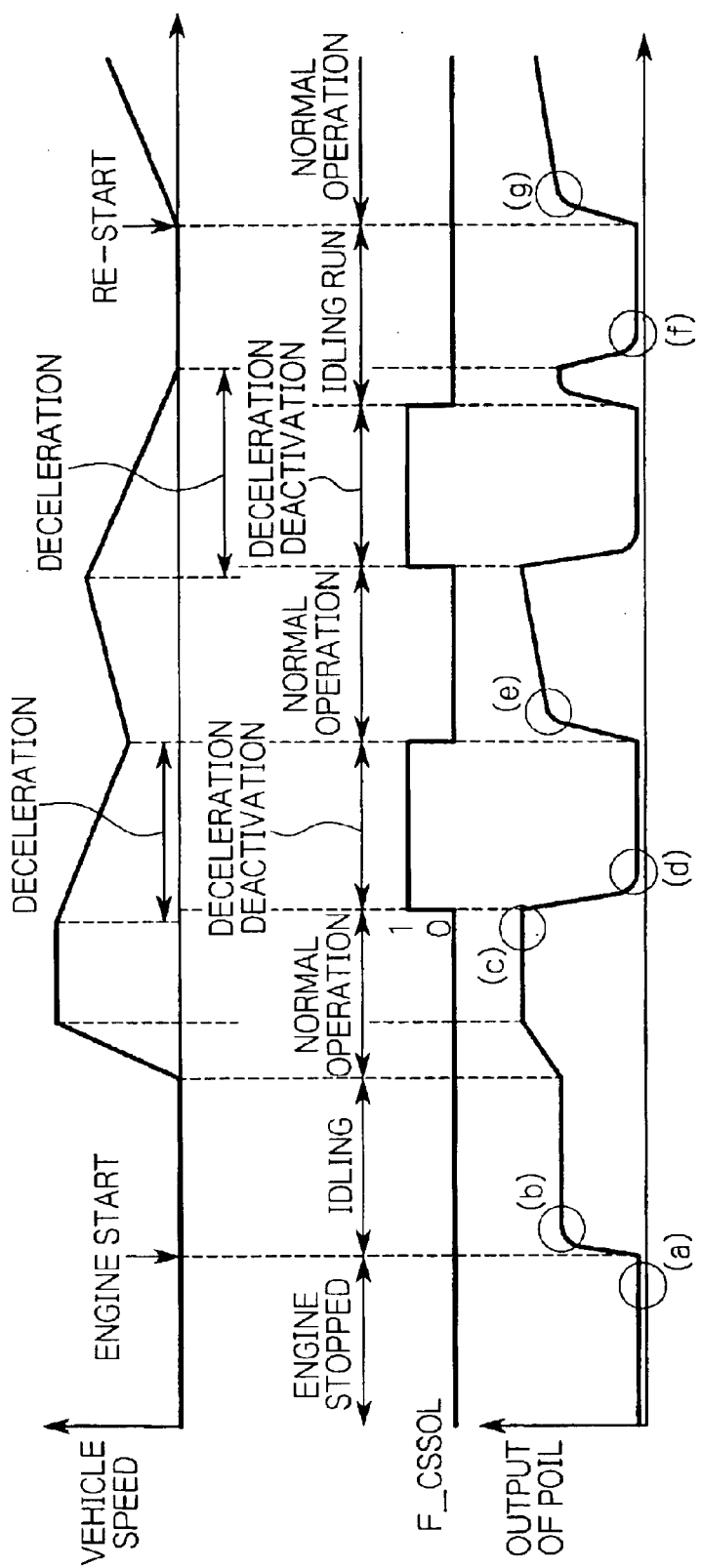
FIG. 12 is an explanation diagram showing the running state of the vehicle, the output of the POIL sensor, etc.

FIG. 12 shows the state of the cylinder deactivation solenoid flag F_CSSOL and the checking state of the POIL sensor S10 at an engine stopped state, at start of the engine, during the normal operation, during the deceleration deactivation operation, and at re-start of the engine.

At an engine stopped state, the output of the POIL sensor S10 indicates low oil pressure (step S204 in FIG. 9) at position (a). At this moment, the cylinder deactivation solenoid flag F_CSSOL indicates "0".

When the engine is started, goes into the normal operation via an idling state, it is confirmed (step S222 in FIG. 10) that the output of the POIL sensor S10 is within a predetermined pressure range (steps S220 and S221 in FIG. 10) depending on the engine revolution rate NE at positions (b) and (c). At this moment, the cylinder deactivation solenoid flag F_CSSOL indicates "0".

When the vehicle decelerates and the vehicle goes into the deceleration deactivation operation, it is confirmed (step S230 in FIG. 10) that the output of the POIL sensor S10 indicates low oil pressure (step S229 in FIG. 10) at position (d). At this moment, the cylinder deactivation solenoid flag F_CSSOL indicates "1".

Figure 10:
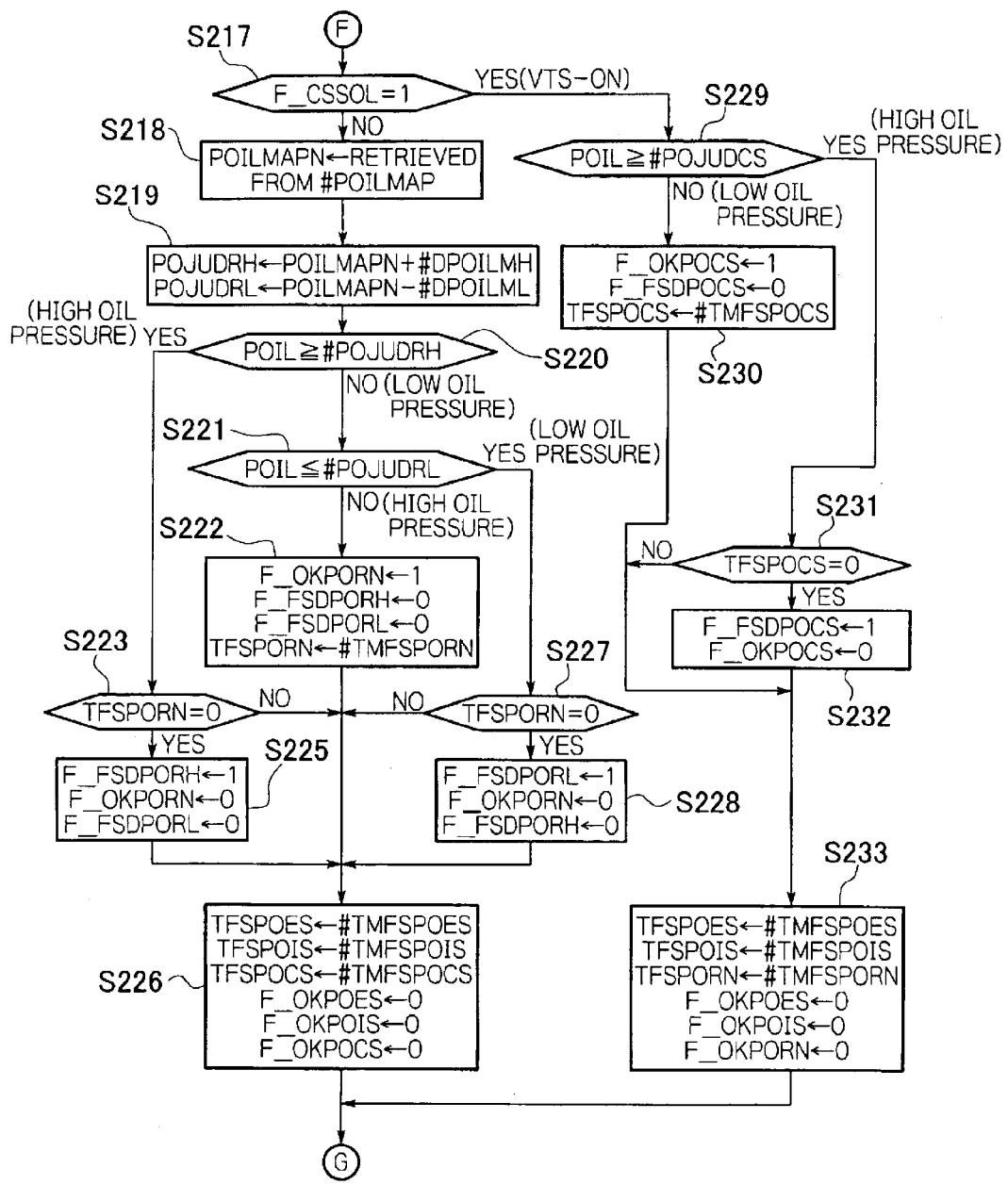
FIG. 10 is a flowchart showing the operation for detecting failures of a POIL sensor in the embodiment of the present invention.

When the vehicle again goes into the normal operation, as in the above case, the output of the POIL sensor S10 at position (e) is confirmed (step S222 in FIG. 10). At this moment, the cylinder deactivation solenoid flag F_CSSOL indicates "0".

Furthermore, when the vehicle decelerates and, as in the above case, the vehicle again goes into the deceleration cylinder deactivation operation, it is confirmed (step S213 in FIG. 9) that the output of the POIL sensor S10 indicates low oil pressure (step S212 in FIG. 9) at position (f). At this moment, the cylinder deactivation solenoid flag F_CSSOL indicates "0".

When the engine is re-started and the vehicle goes into the normal operation, the output of the POIL sensor S10 at position (g) is confirmed (step S222 in FIG. 10). At this moment, the cylinder deactivation solenoid flag F_CSSOL indicates "0".

When the output of the POIL sensor S10 does not satisfy the predetermined conditions in any of the driving states, i.e., pressure at position (a) is not sufficiently low, or pressure at positions (b), (c), (e), and (g) is not sufficiently high, or pressure at position (f) is not sufficiently low, the failure of the sensor S10 can be detected (steps S209 and S210 in FIG. 9) taking into consideration the value of the cylinder deactivation solenoid flag F_CSSOL In this case, because it is determined that the POIL sensor S10 has failed when an abnormal output of the POIL sensor S10 continues for a predetermined time period in any of the driving states (steps S206, S214, S223, S227, and S231), the reliability of the failure detection is high.

Figure 14:
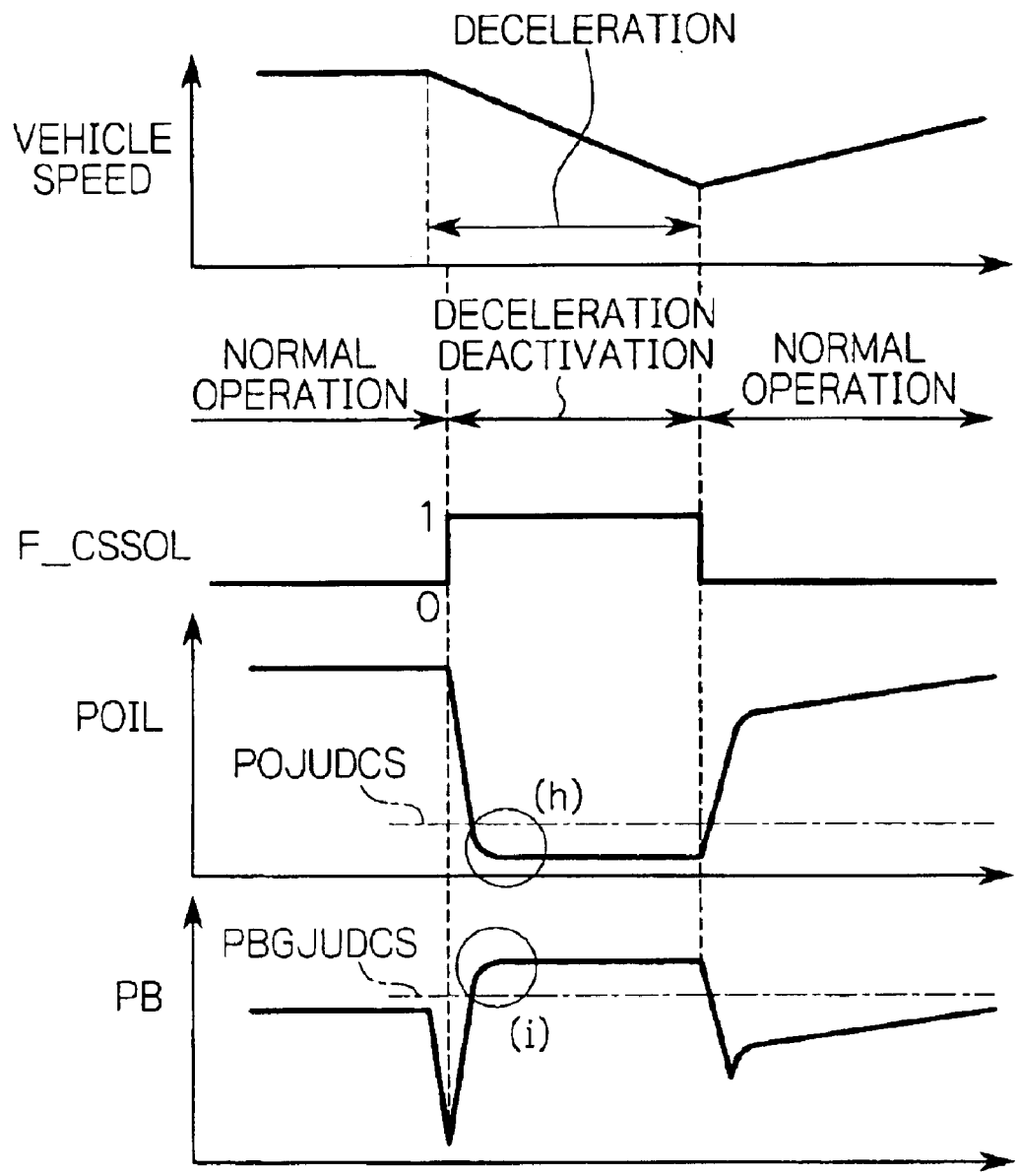
FIG. 14 is an explanatory diagram showing the running state of the vehicle, the output of the POIL sensor, the negative pressure in an air-intake passage, etc.

On the other hand, another case in which the driving state changes from the normal operation, to the deceleration deactivation operation, and again to the normal operation, as shown in FIG. 14, will be explained below. When the driving state changes from the normal operation to the deceleration deactivation operation, and after the solenoid of the spool valve 71 is switched ON (step S301 in FIG. 11), the POIL sensor S10 is checked (step S229 in FIG. 10) at position (h), and the state of the oil pressure normal flag at cylinder deactivation F_OKPOCS, which indicates the checked result of the sensor S10, is judged. When the value of this flag is "1" and POIL sensor S10 exhibits no failure, the intake passage negative pressure PB is checked at position (i). When the deceleration cylinder deactivation operation is executed and the deactivatable cylinders are actually deactivated, the intake passage negative pressure PB increases toward atmospheric pressure, which indicates actual deactivation, as shown in FIG. 14 (steps S308 and S309 in FIG. 11), whereas, if the intake passage negative pressure PB does not increase toward atmospheric pressure, which indicates failure in the deactivatable cylinders, i.e., that the deactivatable cylinders are not deactivated (steps S305 and S306 in FIG. 11).

Accordingly, failures, i.e., that the deactivatable cylinders are not deactivated, such as locking of the pin 57a or disengaging pin 57b, closing of the passage for deactivation 72 or hydraulic passage 59a, or closing of the passage for canceling deactivation 73, hydraulic passage 59a, or communication port 61a, can be detected.

According to the above embodiment, in each of the driving states shown in FIG. 12, because when each of the oil pressures measured by the POIL sensor S10 does not satisfy (determined to be "YES" in steps S204, S212, S220, S221, and S229) each of the thresholds for oil pressure (the threshold at engine stall #POJUDES, the threshold at idling stop #POJUDIS, the upper threshold at normal operation #POJUDRH, the lower threshold at normal operation #POJUDRL, and the threshold at cylinder deactivation #POJUDCS), it is, in each case, deemed to be abnormal (steps S207, S215, S225, S228, and S232), in which oil pressure is not properly measured, or oil pressure is not properly applied to the passage for deactivation 72 or to the passage for canceling deactivation 73, it is possible to determine that the POIL sensor S10 has failed, or the spool valve has not properly switched.

Because the above failures can be detected regardless of the driving state, the reliability of failure detection is high.

Because, as shown in FIG. 13, each threshold can be set depending on oil pressure which varies in accordance with the engine revolution rate, and in addition, oil temperature can be included in determining each threshold (step S218), failures can be accurately detected while oil pressure of the operation oil, which varies depending on the engine revolution rate, is taken into consideration.

Moreover, during the deceleration cylinder deactivation operation, when no abnormality is detected in the POIL sensor S10 (i.e., determined to be "YES" in step 302), and when the intake passage negative pressure PBGA does not satisfy the condition of the retrieved value #PBGJUDCS (judged "YES" in step S303), it is deemed to be abnormal (in steps S305 and S306), and it is possible to detect that oil pressure is not applied to the variable valve timing mechanism VT through the passage for deactivation 72, passage for canceling deactivation 73, etc.; therefore, failures, i.e., that the deactivatable cylinders are not deactivated, such as locking of the pin 57a or disengaging pin 57b, closing of the passage for deactivation 72 or hydraulic passage 59a, or closing of the passage for canceling deactivation 73, hydraulic passage 59a, or communication port 61a, can be detected.

In such cases, because the retrieved value #PBGJUDCS is calculated using interpolation in a certain range between a retrieved value for low altitude and a retrieved values for high altitude, failures can be accurately detected.

As explained above, according to the present invention, it is ensured that failures are accurately detected, and a hybrid vehicle having a reliable structure can be obtained.

Note that it is also possible to detect shifting in characteristics of the POIL sensor S10 by comparing with the output of the POIL sensor S10 depending on the engine revolution rate NE shown in FIG. 13.

INDUSTRIAL APPLICABILITY

As explained above, according to the present invention, when the oil pressure of the operation oil measured by the oil pressure measuring section in each of the driving states does not satisfy the conditions defined by the thresholds for each of the operation states, it is deemed to be abnormal by the abnormality judgement section; thus, it is possible to determine that the oil pressure is not properly measured, or oil pressure is not properly applied to the passage for deactivation execution or the passage for deactivation cancellation, whereby it is possible to determine that the abnormality is due to failures in the oil pressure measuring section or the actuator. Accordingly, a countermeasure for the failures can be immediately taken.

In addition, according to the present invention, because the above failures can be detected regardless of the driving states, the reliability of failure detection is high.

Moreover, according to the present invention, because it is taken into consideration that oil pressure varies depending on engine revolution rate, failures can be properly detected in accordance with the oil pressure of the operation oil which varies depending on engine revolution rate.

Furthermore, according to the present invention, because the threshold can be set taking into consideration not only the pressure of the operation oil varying depending on engine revolution rate, but also the temperature of the operation oil, failures can be accurately detected.

In addition, according to the present invention, during the deceleration cylinder deactivation operation, when no abnormality is detected by the abnormality judgement section, and when it is determined by the intake negative pressure measuring section that the intake passage negative pressure does not satisfy the conditions of the threshold value for the deceleration cylinder deactivation operation, it is deemed to be abnormal by the abnormality during cylinder deactivation judgement section, and it is possible to detect that oil pressure is not applied to the cylinder deactivation mechanism through the passage for deactivation, or through the passage for canceling deactivation; therefore, it is possible to determine that the failures are due to such as locking of the slide elements, or closing of the passage for deactivation or the passage for canceling deactivation. Accordingly, a countermeasure for the failures can be immediately taken.

Furthermore, according to the present invention, because the intake passage negative pressure varying depending on engine revolution rate can be corrected in accordance with atmospheric pressure, failures can be accurately detected.

Moreover, according to the present invention, failure detection in a hybrid vehicle is ensured, the reliability of the hybrid vehicle can be enhanced.

What is claimed is:

1. A failure detection device for a vehicle having a deceleration deactivatable engine in which it is possible to deactivate at least one cylinder by closing both of intake and exhaust valves thereof by applying the oil pressure of operation oil to a passage for deactivation execution via an actuator, and also it is possible to cancel the closed state of both of said intake and exhaust valves by applying the oil pressure of said operation oil to a passage for deactivation cancellation, said failure detection device comprising:
    a driving state distinguishing section for distinguishing the current driving state of said vehicle from several driving states;
    an oil pressure measuring section provided in said passage for deactivation cancellation for measuring the oil pressure of said operation oil;
    an oil pressure condition judgement section for determining whether or not the oil pressure of said operation oil measured by said oil pressure measuring section satisfies threshold conditions for the oil pressure of said operation oil in each of said driving states; and
    an abnormality judgement section for making judgement that abnormality exists when it is determined, by said oil pressure condition judgement section, that the oil pressure of said operation oil does not satisfy said threshold conditions.

2. A failure detection device according to claim 1, wherein said driving states include a engine stopped state before engine starting, a normal driving operation including idling operation, a deceleration cylinder deactivation operation, an idling stop mode in which said engine is stopped under predetermined conditions and said engine is started when said predetermined conditions are not satisfied.

3. A failure detection device according to claim 2, wherein said threshold conditions for the oil pressure of said operation oil for said normal driving operation are set depending on the revolution rate of said engine.

4. A failure detection device according to claim 3, wherein said threshold conditions for the oil pressure of said operation oil being set depending on the revolution rate of said engine are set taking into consideration the temperature of said operation oil.

5. A failure detection device according to claim 2, further comprising:
    an intake passage negative pressure measuring section for measuring the negative pressure in an intake passage;
    an intake passage negative pressure condition judgement section for determining whether or not the negative pressure in said intake passage measured by said intake passage negative pressure measuring section satisfies negative pressure threshold conditions for said deceleration cylinder deactivation operation; and
    an abnormality during cylinder deactivation judgement section for making judgement that abnormality exists even when it is determined that abnormality does not exist by said abnormality judgement section, and when it is determined, by said intake passage negative pressure condition judgement section, that the negative pressure in said intake passage does not satisfy said negative pressure threshold conditions.

6. A failure detection device according to claim 1, wherein said negative pressure threshold conditions are set depending on the revolution rate of said engine and are corrected depending on atmospheric pressure.

7. A failure detection device according to claim 1, wherein said vehicle is a hybrid vehicle which has not only said engine but also an electric motor as the drive source, and in which regenerative braking is performed by said motor, when said vehicle is decelerated, depending on deceleration state of said vehicle.

8. A failure detection device according to claim 1, wherein a cylinder deactivation mechanism of said engine is a mechanism in which a cylinder deactivation state and a cylinder deactivation cancellation state are altered by a slide element operated by the pressure of said operation oil.

* * * * *